US009465633B2

(12) United States Patent
Newell et al.

(10) Patent No.: US 9,465,633 B2
(45) Date of Patent: Oct. 11, 2016

(54) DISPLAYING APPLICATIONS OF A VIRTUAL MOBILE DEVICE IN A USER INTERFACE OF A MOBILE DEVICE

(75) Inventors: Craig Newell, Cambridge, MA (US); Stephen Deasy, Brighton, MA (US)

(73) Assignee: VMware, Inc., Palo Alto, CA (US)

( * ) Notice: Subject to any disclaimer, the term of this patent is extended or adjusted under 35 U.S.C. 154(b) by 145 days.

(21) Appl. No.: 13/566,409

(22) Filed: Aug. 3, 2012

(65) Prior Publication Data

US 2013/0145366 A1 Jun. 6, 2013

Related U.S. Application Data

(60) Provisional application No. 61/515,656, filed on Aug. 5, 2011.

(51) Int. Cl.
*G06F 9/455* (2006.01)
*G06F 3/0482* (2013.01)
*G06F 9/44* (2006.01)
*G06F 3/0484* (2013.01)

(52) U.S. Cl.
CPC ......... *G06F 9/45533* (2013.01); *G06F 3/0482* (2013.01); *G06F 3/0484* (2013.01); *G06F 9/441* (2013.01); *G06F 9/4445* (2013.01); *G06F 9/45545* (2013.01)

(58) Field of Classification Search
USPC .......................................................... 718/1
See application file for complete search history.

(56) References Cited

U.S. PATENT DOCUMENTS

| | | |
|---|---|---|
| 5,757,371 A | 5/1998 | Oran et al. |
| 6,397,337 B1 | 5/2002 | Garrett et al. |
| 6,877,098 B1 | 4/2005 | Lavelle et al. |
| 7,356,677 B1 | 4/2008 | Rafizadeh |
| 7,424,601 B2 | 9/2008 | Xu |
| 7,681,134 B1 | 3/2010 | Grechishkin et al. |
| 7,734,893 B2 | 6/2010 | Hattori et al. |
| 7,865,893 B1 | 1/2011 | Omelyanchuk et al. |
| 8,086,823 B2 | 12/2011 | Hattori et al. |
| 8,099,541 B2 | 1/2012 | Serebrin |
| 8,117,554 B1 | 2/2012 | Grechishkin et al. |
| 8,151,275 B2 | 4/2012 | Yokota |

(Continued)

OTHER PUBLICATIONS

Jayce Ooi, MMTaskManager v1.6 a simple task manager for Windows Mobile, Apr. 13, 2010, Jayce Ooi's Paradise.*

(Continued)

*Primary Examiner* — Emerson Puente
*Assistant Examiner* — Steven Do

(57) ABSTRACT

One or more embodiments of the invention facilitate displaying application icons of a guest environment in a host environment of a mobile device, wherein the guest environment is running in a virtual machine supported by a hypervisor running within the host environment. One method comprises forwarding, by a hypervisor-aware service running in the virtual machine to the hypervisor, a list of applications installed in a guest operating system (OS) of the virtual machine. For each of the installed applications, the hypervisor provides metadata to a host OS running in the host environment, wherein the metadata comprises an application icon and an instruction to launch a proxy application installed in the host environment. Upon a launch of the proxy application when a user selects the application icon, the proxy application requests the hypervisor to communicate with the hypervisor-aware service to launch the installed application in the guest environment.

20 Claims, 22 Drawing Sheets

(56) References Cited

U.S. PATENT DOCUMENTS

| | | | |
|---|---|---|---|
| 8,161,478 B2 | 4/2012 | Seguin et al. | |
| 8,416,253 B2 | 4/2013 | Minematsu et al. | |
| 8,612,975 B2 | 12/2013 | Serebrin et al. | |
| 8,694,992 B2 | 4/2014 | Abbondanzio et al. | |
| 8,925,103 B2 | 12/2014 | Kim et al. | |
| 9,223,606 B1* | 12/2015 | Vaidya | G06F 9/45558 |
| 2002/0051531 A1 | 5/2002 | Suzuki | |
| 2003/0228866 A1* | 12/2003 | Pezeshki | 455/422.1 |
| 2005/0160423 A1 | 7/2005 | Bantz et al. | |
| 2005/0216920 A1 | 9/2005 | Tewari et al. | |
| 2006/0010314 A1 | 1/2006 | Xu | |
| 2006/0179410 A1 | 8/2006 | Deeds | |
| 2007/0150842 A1 | 6/2007 | Chaudhri et al. | |
| 2007/0233880 A1 | 10/2007 | Nieh et al. | |
| 2007/0244926 A1* | 10/2007 | Vitanov et al. | 707/104.1 |
| 2008/0028400 A1 | 1/2008 | Taillefer et al. | |
| 2008/0244569 A1 | 10/2008 | Challener et al. | |
| 2008/0307001 A1* | 12/2008 | Cisler et al. | 707/104.1 |
| 2009/0300263 A1 | 12/2009 | Devine et al. | |
| 2010/0070677 A1 | 3/2010 | Thakkar | |
| 2010/0115508 A1 | 5/2010 | Davis et al. | |
| 2011/0107008 A1 | 5/2011 | Ben-Yehuda et al. | |
| 2011/0141124 A1 | 6/2011 | Halls et al. | |
| 2011/0197190 A1 | 8/2011 | Hattori et al. | |
| 2011/0296234 A1 | 12/2011 | Oshins et al. | |
| 2011/0307531 A1 | 12/2011 | Gaponenko et al. | |
| 2011/0314467 A1* | 12/2011 | Pearson | 718/1 |
| 2012/0092351 A1 | 4/2012 | Barnes | |
| 2012/0151178 A1 | 6/2012 | Brownlow et al. | |
| 2012/0159139 A1 | 6/2012 | Kim et al. | |
| 2012/0159482 A1 | 6/2012 | Jeong et al. | |
| 2012/0166997 A1 | 6/2012 | Cho et al. | |
| 2012/0278750 A1 | 11/2012 | Abraham et al. | |
| 2012/0284297 A1 | 11/2012 | Aguera-Arcas et al. | |
| 2012/0324213 A1 | 12/2012 | Ho et al. | |
| 2013/0013953 A1 | 1/2013 | Eck et al. | |
| 2013/0022030 A1 | 1/2013 | Hillier | |

OTHER PUBLICATIONS

Caceres et al., Virtual Individual Servers as Privacy-Preserving Proxies for Mobile Devices, Aug. 17, 2009, MobiHeld'09.*

International Search Report and Written Opinion dated Nov. 12, 2012, International Application No. PCT/US2012/049772, 11 pages.

Barrato et al. "MobiDesk: Mobile Virtual Computing," Sep. 26, 2004, MobiCom '04, pp. 1-15.

Office Action mailed May 10, 2016 for U.S. Appl. No. 14/922,262.

Notice of Allowance mailed May 19, 2016 for U.S. Appl. No. 13/566,423.

* cited by examiner

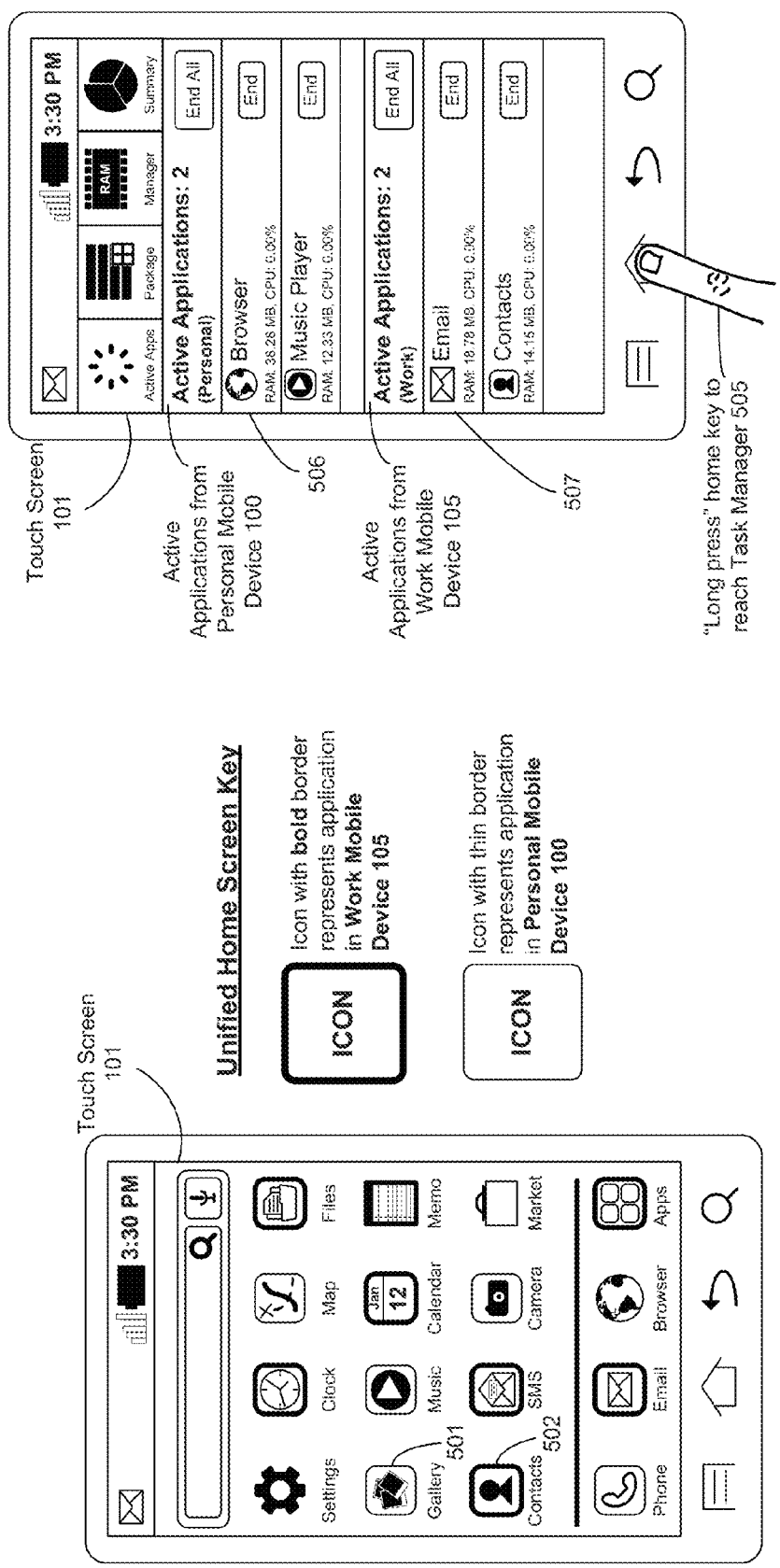

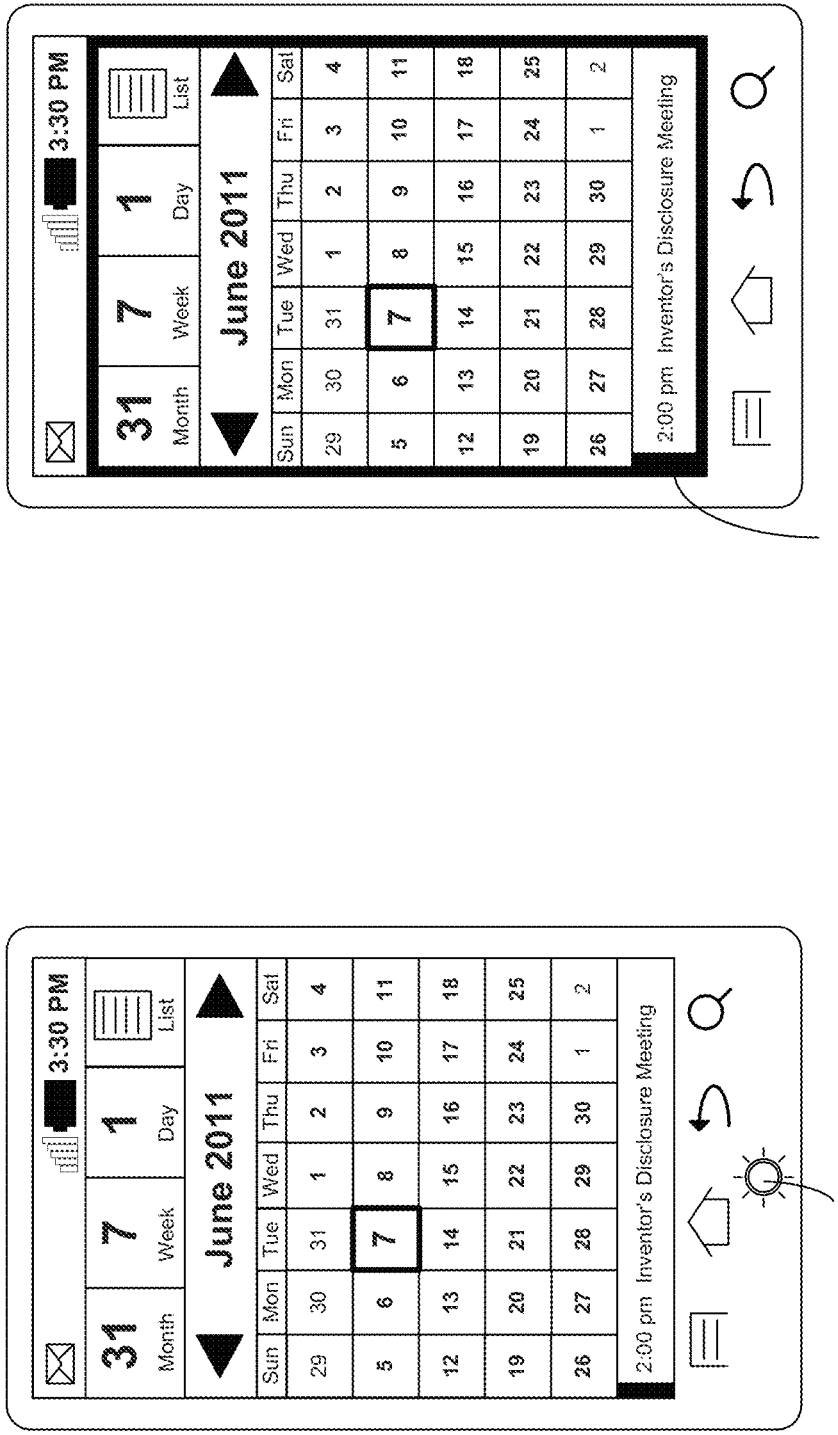

Unified Calendar Application 1300

Personal Device Calendar Application 1305

Work Device Calendar Application 1310

DISPLAYING APPLICATIONS OF A VIRTUAL MOBILE DEVICE IN A USER INTERFACE OF A MOBILE DEVICE

CROSS-REFERENCE TO RELATED APPLICATIONS

This application claims the benefit of U.S. Provisional Patent Application 61/515,656 filed on Aug. 5, 2011 and entitled "User Interfaces for Mobile Computing Devices Having Personal and Work Environments," which is hereby incorporated by reference. This application is also related to the patent applications entitled "Switching Between Mobile User Interfaces for Personal and Work Environments" Ser. No. 13/566,288, "Unified Notification Bar between Virtual Mobile Device and Physical Mobile Device" Ser. No. 13,566,423, "Lock Screens to Access Work Environments on a Personal Mobile Device" Ser. No. 13/566,734, and "Sharing Work Environment Information Sources with Personal Environment Applications" Ser. No. 13/566,745, all of which are assigned to the assignee of this application and have been filed on the same day as this application.

BACKGROUND

Over the past decade, enterprises have experienced a substantial increase in the productivity of its workforce when providing them with business mobile devices. In the past, given their high cost, business mobile devices were mainly allocated to management and focused on providing employees with email access and cellular phone capabilities. However, recent improvements in the computing power, mobile display technologies and connection speeds of mobile devices, combined with the continued decreases in hardware costs, have made powerful mobile devices available even to the general public for personal use. More and more individuals personally own powerful mobile devices, such as smartphones, that, in addition to serving as a cellular phone, can be used in many of the same ways as a desktop or a laptop, such as accessing emails, browsing documents or the internet, game playing, listening to audio or viewing a video, and personal information management (PIM).

Due to the above trends in mobile devices, enterprises are currently experiencing an "invasion" of personal devices into the workplace. Given the sophisticated capabilities of their personal mobile devices, employees no longer desire possessing a separate personal and business mobile device and continually pressure information technology (IT) departments to support personal devices brought into the workplace. As such, IT departments struggle to maintain a proper balance between enabling a certain level of access to enterprise data (e.g., such as access to email, contacts, documents, and the like) on personal devices and ensuring adequate security measures to protect corporate intellectual property in such enterprise data. This phenomenon has led enterprises to investigate the viability of a "Bring Your Own Device" (BYOD) strategy to IT, where a personal mobile device is provisioned by IT departments with the capability of operating as a complete business mobile device in a secure fashion.

Such a BYOD strategy could significantly decrease IT costs (e.g., by eliminating or reducing the need to purchase and provision hardware devices) and provide mobile enterprise access to many more employees than was previously possible (e.g., due to cost concerns), thereby achieving greater increases in productivity than before. However, significant challenges arise in providing streamlined user interfaces on the mobile device that enable users to seamlessly switch from a personal mobile environment to a business mobile environment while still maintaining adequate security and data partitioning between the "personal world" and "business world" on the mobile device.

SUMMARY

One or more embodiments of the invention facilitate displaying application icons of a guest environment in a host environment of a mobile device, wherein the guest environment is running in a virtual machine supported by a hypervisor running within the host environment. One method comprises forwarding, by a hypervisor-aware service running in the virtual machine to the hypervisor, a list of applications installed in a guest operating system (OS) of the virtual machine. For each of the installed applications, the hypervisor provides metadata to a host OS running in the host environment, wherein the metadata comprises an application icon for the installed application and an instruction to launch a proxy application installed in the host environment upon a selection by a user of the application icon and wherein the host OS displays the application icon on a user interface (UI) of the mobile device upon receipt of the metadata. Upon a launch of the proxy application by the host OS when a user selects the application icon on the UI of the mobile device, the proxy application requests the hypervisor to communicate with the hypervisor-aware service running in the virtual machine to launch the installed application in the guest environment.

BRIEF DESCRIPTION OF THE DRAWINGS

FIG. 5A illustrates a unified home screen that includes UI elements of both the personal mobile device and the work mobile device.

FIG. 5B illustrates a display of a unified task manager for active applications from both the personal mobile device and the work mobile device.

FIGS. 7A and 7B are schematic illustrations of a mobile computing device that is configured in different ways to notify a user of the computing device the user is working in.

DETAILED DESCRIPTION

Figure 1:
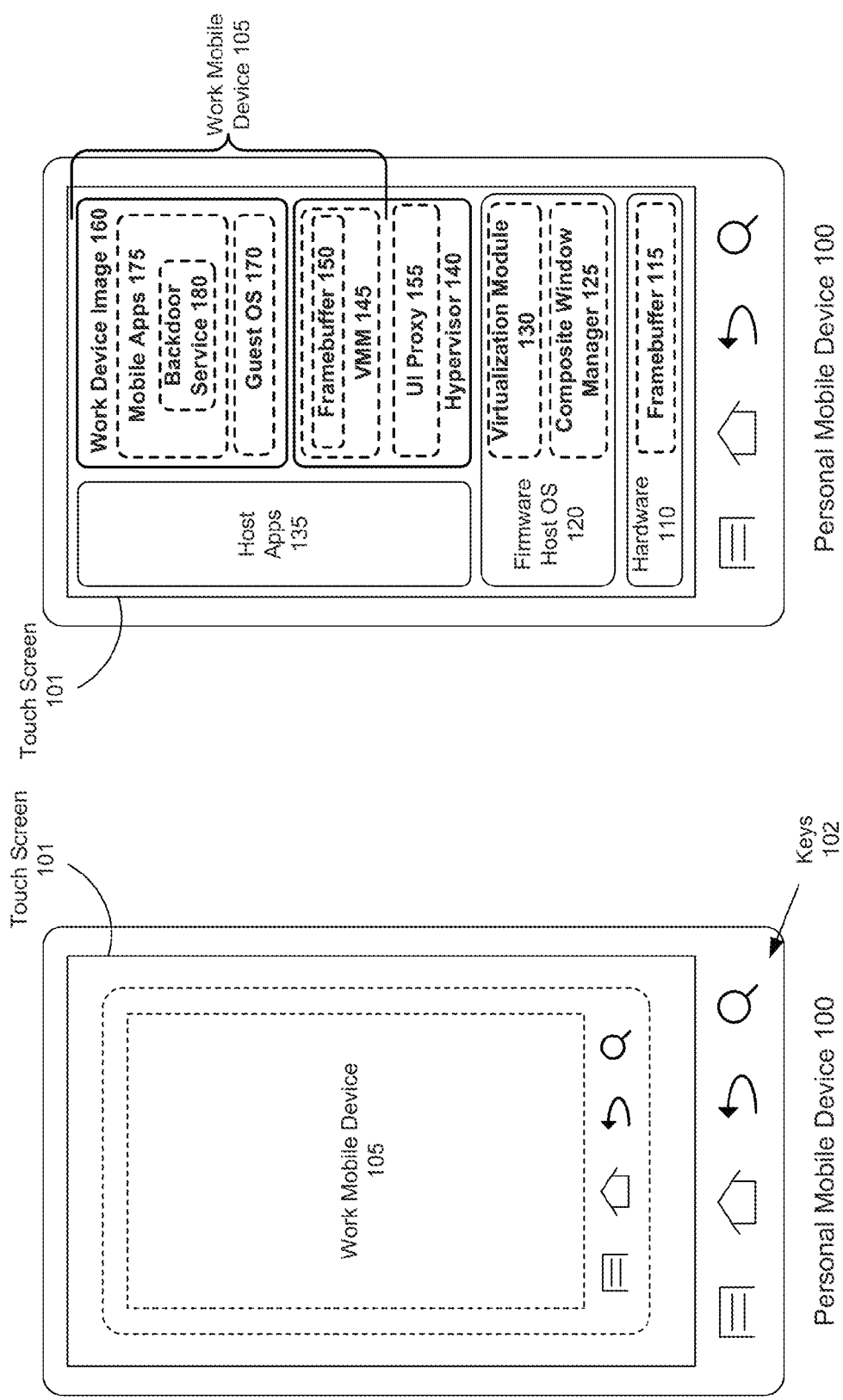
FIG. 1A is a schematic illustration of a mobile computing device according to one or more embodiments of the invention.
FIG. 1B is a block diagram that illustrates components of the mobile computing device of FIG. 1A.

FIG. 1A is a schematic illustration of a mobile device according to one or more embodiments of the invention. The mobile device shown in FIG. 1A is a personal mobile device 100 having a touch screen 101 and a plurality of keys 102. Personal mobile device 100 may be smartphone, a tablet computing device, and in general any computing device that is portable and configured for wireless connectivity with a network. Personal mobile device 100, conceptually, provides access to a completely separate work mobile device 105 that is generally isolated and operates separately from personal mobile device 100 (illustrated in dashed lines to indicate the work mobile device 105 is running as a software component inside personal mobile device 100). As further discussed below, in one embodiment, work mobile device 105 operates as a virtual machine running within a virtualization platform that is itself running on top of the operating system of personal mobile device 100. As further detailed in FIG. 1B, personal mobile device 100 comprises hardware 110 that includes a framebuffer 115 that stores display data and drives the user interface display on touch screen 101. Personal mobile device 100 also includes firmware that includes host operating system (OS) 120, and host applications 135 running on top of host OS 120. In one embodiment, host OS 120 is the Android™ operating system provided by Google, Inc., and includes a composite window manager 125 (known in the Android operating system as SurfaceFlinger) that manages and controls access by host applications 135 to framebuffer 115 for display of user interfaces on touch screen 101. In the embodiment of FIG. 1B, the firmware of personal mobile device 100 also includes a virtualization module 130 that is a trusted operating system level component that is able to sign, authenticate or otherwise grant privileged (e.g., superuser) access to certain applications or components running on top of host OS 120. In particular, a hypervisor application 140 that is installed on top of host OS 120 interacts with virtualization module 130 in order to obtain elevated capabilities and execute in privileged modes. In one embodiment, hypervisor 140 is downloaded and installed by a user of personal mobile device 100 from an application store (e.g., Android Market, iPhone App Store, Amazon Appstore, various carrier or device manufacturer based application stores, etc.). Once installed, hypervisor 140 (or a management component related thereto) can establish a connection with the IT department of the user's employer and download a work device image 160 (e.g., stored on the file system of host OS 120) that can be accessed by a virtual machine that is launched by hypervisor 140 to serve as work mobile device 105. It should be recognized that, in alternative embodiments, work mobile device 105 may be configured with drivers and other appropriate virtualization software to interface directly with hardware 110 so that work mobile device 105 runs directly on top of hardware 110 and host OS 120 is not interposed between work mobile device 105 and hardware 110 (such an embodiment sometimes referred to as a "bare metal" hypervisor, as opposed to a "hosted" hypervisor as depicted in FIG. 1B).

As depicted in FIG. 1B, work mobile device 105 operates as a virtual machine running on hypervisor 140 and, conceptually, includes a virtual machine monitor (VMM) 145 and accesses a "virtual disk," which is shown as work device image 160. VMM 145 may considered a component of hypervisor 140 (which itself runs as a high priority user-level application on host OS 120) that emulates hardware resources for work mobile device 105 such as a virtual framebuffer 150 that functions as a display buffer for work mobile device 105. Work device image 160 includes a guest OS 170, which may be any commodity operating system such as the Android operating system and applications 175 running on top of guest OS 170. In the embodiment of FIG. 1B, applications 175 includes a backdoor service application 180 that establishes a direct communication channel to hypervisor 140 (which itself runs on top of host OS 140). Backdoor service application 180 is a "backdoor" application because typical applications running on top of guest OS 170 are not aware that they are running in a virtual machine. However, backdoor service application 180 is aware that it is running in a virtual machine on top of hypervisor 140 and can therefore request or provide special data and services to and from hypervisor 140, for example, when certain user interface enhancement as further described below between personal mobile device 100 and work mobile device 105 are desirable. In one embodiment, backdoor service 180 establishes the direct communication channel with hypervisor 140 by connecting to a unique network port that hypervisor 140 has opened and is listening on, although it should be recognized that alternative embodiment can establish such a communication channel utilizing different techniques. As will be further discussed, the direct communication channel between backdoor service 180 and hypervisor 140 facilitates remote procedure calls (RPC) between components existing in personal mobile device 100 and work mobile device 105.

As further depicted in FIG. 1B, hypervisor 140 also includes a user interface (UI) proxy application 155 that, as further detailed herein, serves as a user interface intermediary between personal mobile device 100 and work mobile device 105 by copying contents of virtual framebuffer 150 into hardware framebuffer 115, when requested, so that the UI environment of work mobile device 105 (hereafter referred to as "work environment") can be displayed in place of the UI environment of personal mobile device 100 (hereafter referred to as "personal environment").

Figure 2:
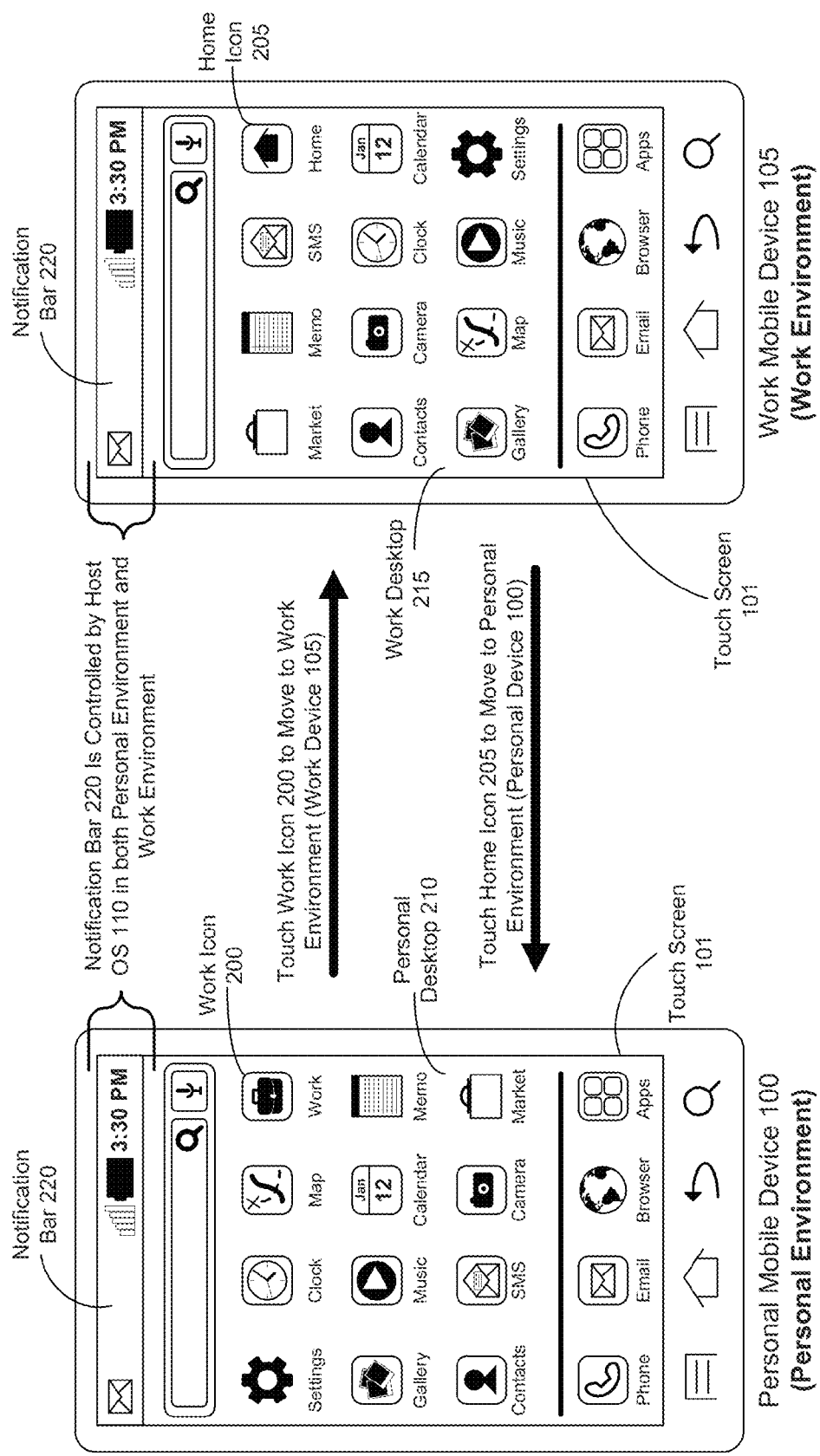
FIG. 2 illustrates user interfaces for a personal mobile device and a work mobile device, a process for switching between the two, and a notification bar that persists in both user interfaces.

FIG. 2 illustrates one embodiment of UI environments for personal mobile device 100 and work mobile device 105 and a mechanism for switching between the two. As depicted, a personal environment for personal mobile device 100 includes a personal desktop 210 that includes icons for a variety of installed applications accessible from personal mobile device 100. Personal desktop 210 also includes a work icon 200 and a notification bar 220 that displays system information for personal mobile device 100 (e.g., as time, battery strength, network signal strength, etc.) as well as notifications from various applications. When the user touches work icon 200 in the personal environment, touch screen 101 switches to a work environment for work mobile device 105 and displays a work desktop 215. As depicted, work desktop 215 includes icons for a variety of installed applications accessible from work mobile device 105 as well as a home icon 205 that enables the user to switch back to the personal environment. As further depicted in the embodiment of FIG. 2, the notification bar displayed in work desktop 215 is the same notification bar 220 that is generated by personal desktop 210 and controlled by host OS 120 (i.e., rather than being a separate notification bar that is generated by guest OS 170 specifically for work mobile device 105). As such, even while a user is the work environment, notifications generated by applications in the personal environment will be displayed in notification bar 220 in work desktop 215.

As should be recognized, when displaying the user interface of personal mobile device 100 in FIG. 2, a component of host OS 120 (e.g., such as a launcher application that generates and manages a main navigational user interface, namely, personal desktop 210) may request composite window manager 125 to populate hardware framebuffer 115 with display data for personal desktop 210, including notification bar 220. Similarly and as further detailed below, when a user selects work icon 200 to enter the work environment, guest OS 170 of work mobile device 105 (e.g., such as a launcher application that generates and manages work desktop 210) ultimately provides composite window manager 125 display data to render work desktop 215 in hardware framebuffer 115. However, as previously discussed, display data for notification bar 220 even within work desktop 215 continues to be provided by host OS 120 and not from guest OS 170 of work mobile device 105 since notification bar 220 originates from personal mobile device 100.

Figure 3A:
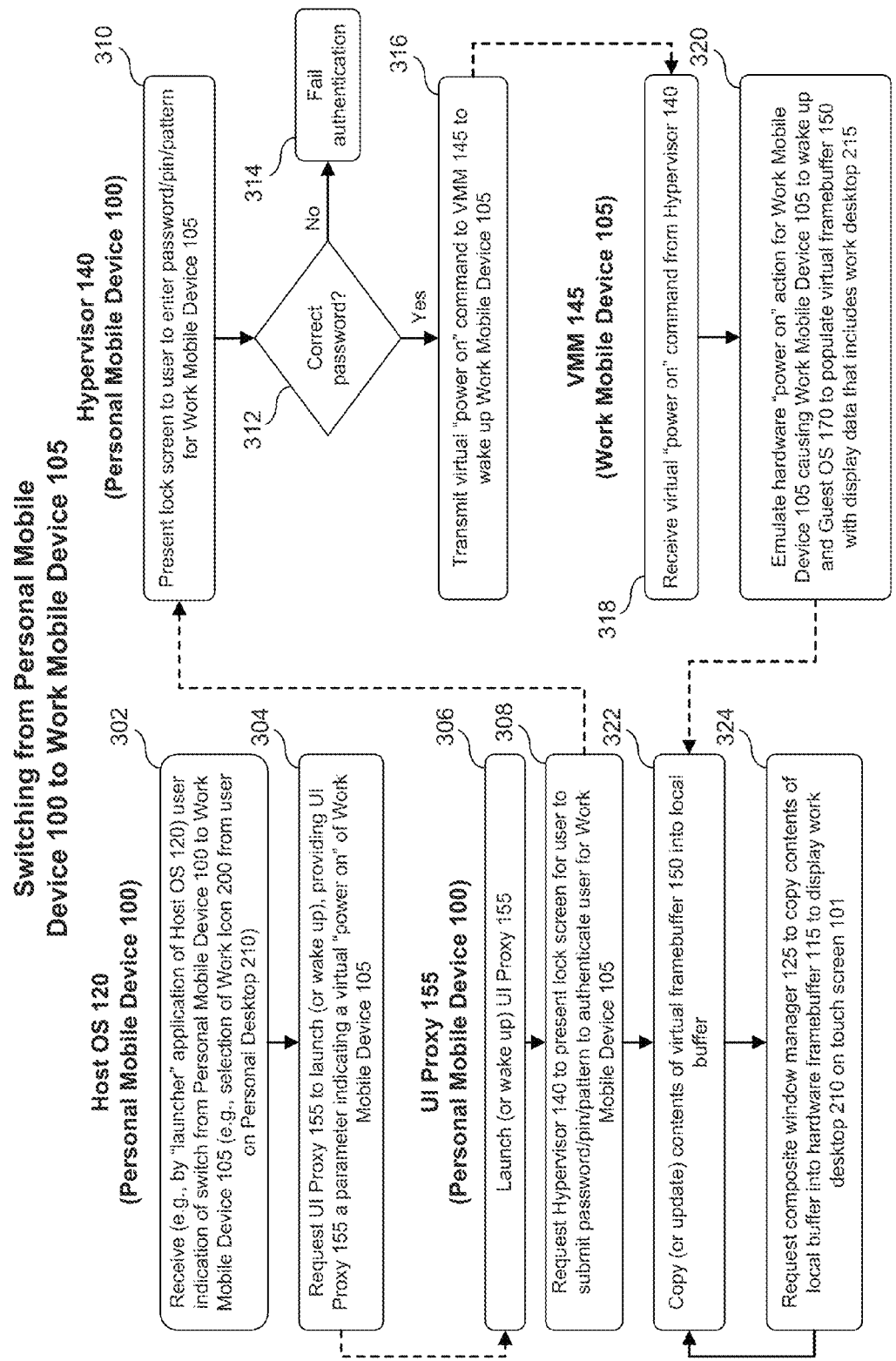
FIG. 3A is a flow diagram that illustrates the process of switching from the personal mobile device to the work mobile device.

FIG. 3A is a flow diagram that illustrates a process of switching from personal mobile device 100 to work mobile device 105. The process includes steps carried out by host OS 120, UI proxy 155, and hypervisor 140 of personal mobile device 100, and steps carried out by VMM 145 of work mobile device 105. The process begins at step 302 when host OS 120 (e.g., by way of a launcher application in one embodiment) receives user indication of a switch from personal mobile device 100 to work mobile device 105. The user indication, as noted above, may be a user selection of work icon 200 on personal desktop 210. In response to the user indication of the switch (e.g., selection of work icon 200), at step 304, host OS 120 requests UI proxy 155 to launch or wake up. For example, a launch action associated with work icon 200 causes host OS 120 to launch (or wake up) UI proxy 155 in a manner similar to launch actions for other icons displayed in personal desktop 210 for other applications 135. In one such embodiment, the launch action associated with work icon 200 may be execution of a file system command that launches or wake up an executable file corresponding to UI proxy 155 (and possibly to further provide additional command line flags or parameters indicating to UI proxy 155 that it should execute a particular sequence of actions relating to "powering ON" work mobile device 105).

At step 306, UI proxy 155, in response to the request from host OS 120, launches or wakes up. Then, at step 308, UI proxy 155 requests hypervisor 140 to present a lock screen display to the user for the submission of credentials (e.g., password, pin, or pattern, etc.) to authenticate himself for access to work mobile device 105. In response, hypervisor 140 carries out user authentication at steps 310-316. At step 310, hypervisor 140 presents a lock screen to the user and prompts the user for credentials for accessing work mobile device 105. If, at step 312, the user fails to provide proper credentials, then authentication fails at step 314. If, at step 312, the user enters proper credentials, hypervisor 140 may launch or otherwise wake up a VMM 145 thread and transmit a virtual power ON command to VMM 145 to wake up work mobile device 105 (step 316).

At step 318, VMM 145 receives the virtual power ON command from hypervisor 140 and, at step 320, wakes up work mobile device 105 by emulating a hardware power ON action for work mobile device 105. This emulation causes guest OS 170 to wake up and begin populating virtual framebuffer 150 with display data that includes work desktop 215.

Returning to UI proxy 155, upon receiving confirmation from VMM 145 that work mobile device 105 has powered ON, UI proxy 155, at step 322, copies or updates contents of virtual framebuffer 150 into a local memory buffer available from host OS 120. Then, at step 324, UI proxy 155 requests composite window manager 125 to copy contents of the local buffer into hardware framebuffer 115 to display contents of the local buffer which includes work desktop 210 on touch screen 101 (it should be recognized that notification bar 220 is already displayed on touch screen 101 and therefore is not part of the display data taken from the local memory buffer). It should be recognized that in alternative embodiments, UI proxy 155 may be able to leverage hardware enhancements provided by hardware 110 of personal mobile device 110 to increase performance and reduce the amount of copying of display data (e.g., between virtual framebuffer 150 to a local memory buffer to hardware framebuffer 115, etc.) for example by requesting composite window manager 125 to redirect hardware framebuffer 115 to receive data directly from virtual framebuffer 150. It should also be recognized that alternative embodiments may not implement all steps described in FIG. 3A. For example, one alternative embodiment (as further described herein) may not require hypervisor 140 to present a lock screen to authenticate the user prior to enabling the user to access the work environment.

Figure 3B:
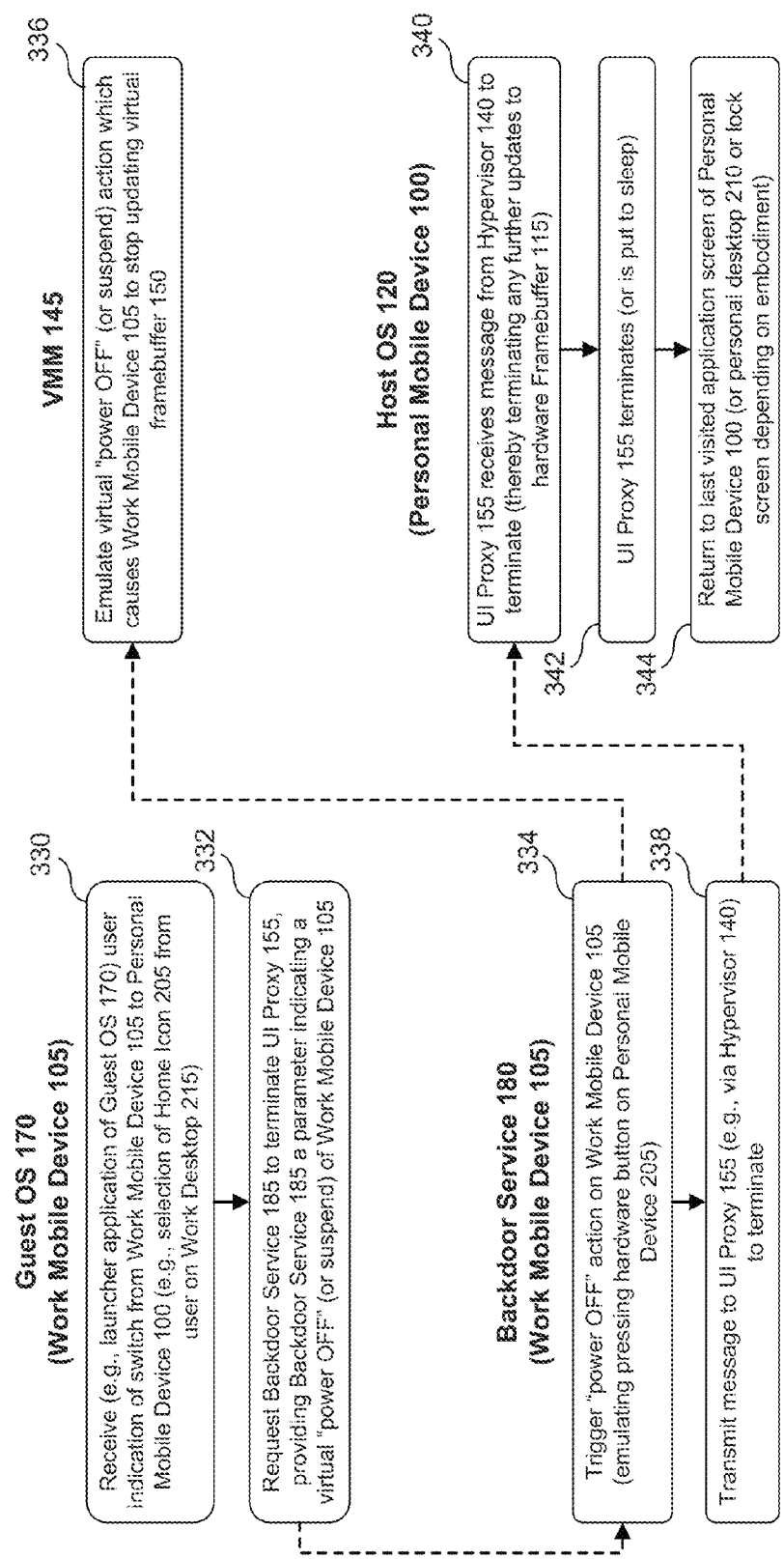
FIG. 3B is a flow diagram that illustrates the process of switching from the work mobile device to the personal mobile device.

FIG. 3B is a flow diagram that illustrates a process of switching from work mobile device 105 to personal mobile device 100. The process includes steps carried out by guest OS 170, backdoor service 180, and VMM 145 of work mobile device 105, and steps carried out by host OS 120 of personal mobile device 100. The process begins at step 330 when guest OS 170 (e.g., by way of a launcher application running on guest OS 170) receives user indication of a switch from work mobile device 105 to personal mobile device 100. The user indication, as noted above, may be a user selection of home icon 205 on work desktop 215. In response to the user indication of the switch, at step 332, guest OS 170 requests backdoor service 180 to terminate UI proxy 155.

At step 334, backdoor service 180, in response to the request from guest OS 170, triggers a power OFF action on work mobile device 105 in VMM 145, where in response to this trigger, VMM 145 emulates the pressing of a hardware power button at step 336 causing work mobile device 105 to stop updating virtual framebuffer 150. Then, at step 338, backdoor service 180 transmits a message to UI proxy 155 via hypervisor 140 to terminate.

At step 340, host OS 120 receives a message from hypervisor 140 to terminate UI proxy 155 which would terminate any updates to hardware framebuffer 115 based on changes to virtual framebuffer 150. As such, at step 342, host OS 120 terminates or puts to sleep UI proxy 155. After the UI proxy 155 is terminated or put to sleep, at step 344, host OS 120 returns control of touch screen 101 to the last visited application of personal mobile device 100 (i.e., prior to having switched to the work environment), thereby causing the application to request composite window manager 125 populate hardware framebuffer 115 in order to render its user interface on touch screen 101. In one embodiment, such a last visited application may be the launcher application of host OS 120 itself which renders personal desktop 210. In alternative embodiments, after the UI proxy 155 is terminated or put to sleep, host OS 120 may instead return to a lock screen asking the user to reauthenticate himself prior to giving the user access to personal mobile device 100.

Figure 4:
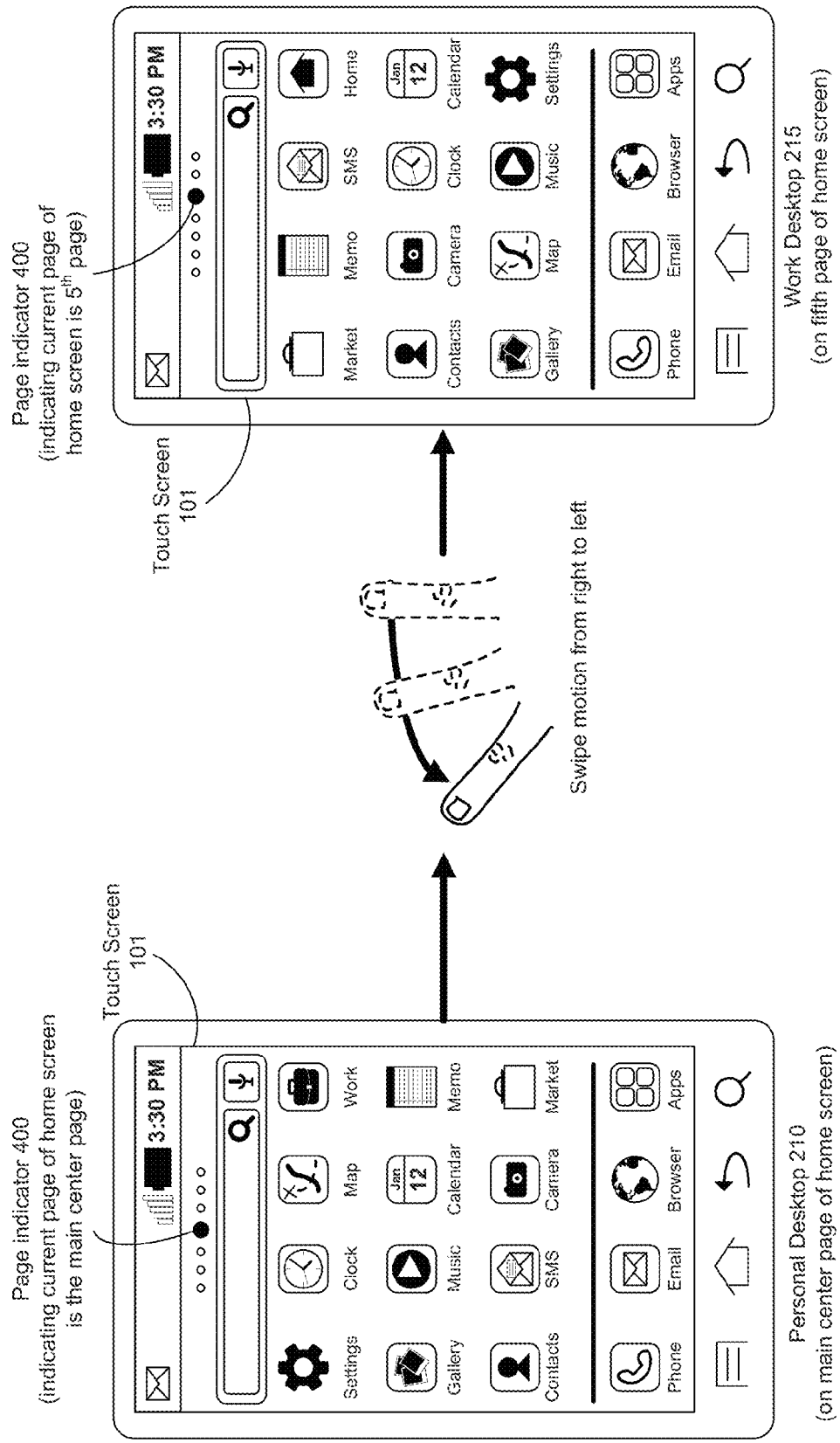
FIG. 4 illustrates user interfaces for the personal mobile device and the work mobile device and another process for switching between the two.

It should be recognized that the switching between the personal environment and the work environment may be carried out in a number of different ways, including the one shown in FIG. 2 and detailed in FIGS. 3A and 3B. In one alternative embodiment, personal mobile device 100 may include a hardware button that triggers switching between the personal environment and work environment as discussed above. FIG. 4 further illustrates another user interfaces for personal mobile device 100 and work mobile device 105 and another process for switching between the two. In this embodiment, the personal environment and the work environment are laid out side-by-side with the personal environment appearing in a center or main page 4 (of 7 pages of a "global" desktop) as shown by page indicator 400 and the work environment appearing in page 5 as shown by page indicator 400. The switching from the personal environment to the work environment is carried out by a right-to-left swipe on touch screen 101. The switching from the work environment to the personal environment is carried out by a left-to-right swipe on touch screen 101.

To implement the switching functionality described above in conjunction with FIG. 4, host OS 120 (or its the launcher application) is modified to recognize the right-to-left swipe and left-to-right swipe motions. That is, the right-to-left swipe motion causes the same actions to be taken as touching work icon 200 in FIG. 2 and detailed in FIG. 3A, namely that UI proxy 155 is launched or woken up so that contents of virtual framebuffer 150 are copied into hardware framebuffer 115 for display on touch screen 101. Similarly, the left-to-right swipe motion causes the same actions to be taken as touching home icon 205 in FIG. 2 and detailed in FIG. 3B, namely that UI proxy 155 is terminated or put to sleep so that contents of virtual framebuffer 150 are no longer copied into hardware framebuffer 115 for display on touch screen 101. It should be recognized that the user interface techniques for switching between the personal and work environment in FIGS. 2 and 4 are merely exemplary and that alternative user interface switching techniques may be implemented consistent with the teachings herein. For example, an alternative user interface switching technique may utilize a hardware button on personal mobile device 100 to trigger the switching processes similar to those described in FIGS. 3A and 3B. Similarly, other swiping motions (up-down direction, diagonal direction, etc.) may be utilized to perform such switching.

It should be noted further that, when the user switches from the personal environment to the work environment in certain embodiments implementing the techniques described above, a lock screen may appear prompting the user to enter his credentials (password, pattern, etc.) prior to allowing the user access to the work environment (e.g., as described in steps 308-316 of FIG. 3A). However, when the user switches from the work environment to the personal environment, a lock screen may not be necessary since a user that has authenticated access to the work environment can be presumed to also have authority to access the personal environment. Similarly, if the user goes straight into the work environment from an initial lock screen presented by personal mobile device 100 as may be possible in the methods described below in conjunction with FIGS. 8A-8C, a lock screen may not be necessary when the user switches to the personal environment based the same presumption. It should be recognized that the converse may not be true because a personal password or pattern may have been shared by members of the user's family and as a result a lock screen upon switching to the work environment becomes necessary. It should be further recognized that in situations where the work password or pattern can be shared, e.g., with enterprise IT personnel, it would be beneficial to display a lock screen upon switching to the personal environment from the work environment.

In addition to prior described embodiments that provide that a capability to switch between user interfaces for the personal environment and work environment, FIG. 5A illustrates a unified home screen 500 that includes UI elements of both personal mobile device 100 and work mobile device 105. In the particular embodiment of FIG. 5A, unified home screen 500 is managed by host OS 120 and includes UI elements of personal mobile device 100 that are illustrated with a thin border (e.g., icon 501 for the photo gallery application) as well as UI elements of work mobile device 105 that are illustrated with a thick border (e.g., icon 502 for the contacts application). In one such embodiment, prior to displaying unified home screen 500, the user would have been prompted for his work password or pattern (and have been successfully authenticated). In certain of such embodiments, if the user was not able to successfully authenticate using his work password and was provided an alternative option to authenticate using his personal password, unified home screen 500 would display only the UI elements of personal mobile device 100 (i.e., if the personal password was successfully authenticated). It should be recognized that the thin and thick borders are only exemplary of how application icons may be implemented to distinguish between applications in the personal and work environments. For example, one alternative embodiment may use different color borders around the application icons or a personal or work "badge" (i.e., smaller icon) overlaid on top of the application icon.

Figure 5C:
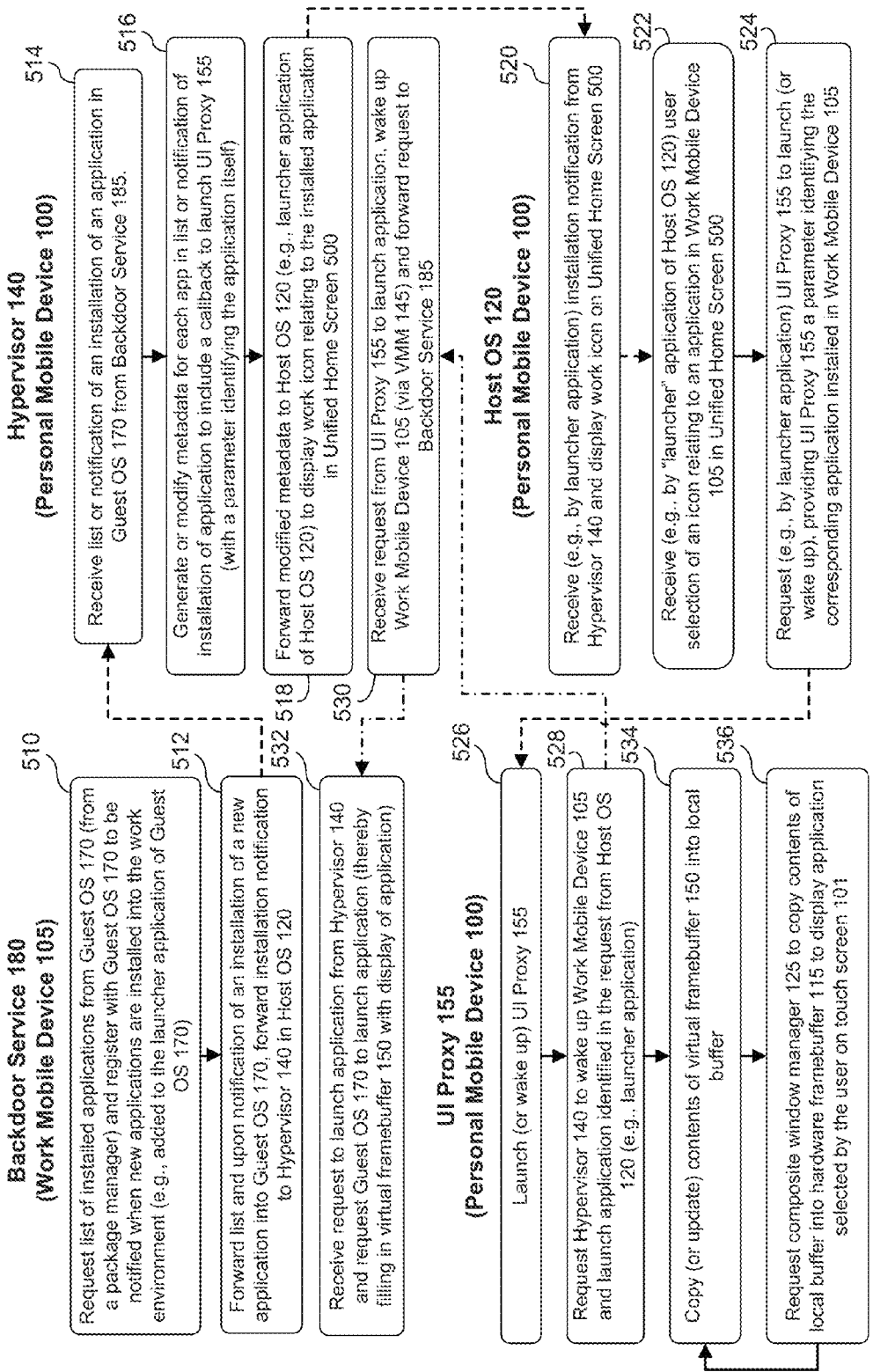
FIG. 5C is a flow diagram that illustrates the process of presenting UI elements from the work mobile device in the unified home screen of FIG. 5A and launching applications in response to selections of such UI elements.

FIG. 5C is a flow diagram that illustrates a process of presenting UI elements of work mobile device 105 in unified home screen 500 of FIG. 5A and launching applications in response to selections of such UI elements. The process includes steps carried out by backdoor service 180 of work mobile device 105, and steps carried out by UI proxy 155, hypervisor 140, and host OS 120 of personal mobile device 100.

At step 510, backdoor service 180 obtains a list of installed applications from guest OS 170 (e.g., from a package manager application that manages installed applications for guest OS 170 in one embodiment) to forward to host OS 120 for display in unified home screen 500. Backdoor service 180 also registers with guest OS 170 to receive notifications any time a user operating in the work environment installs a new application on work mobile device 105 (e.g., added to the launcher application running on guest OS 170). At step 512, backdoor service 180 forwards the list and, subsequently, upon notification of an installation of a new application into guest OS 170, forwards such notification, to hypervisor 140. Hypervisor 140 receives the list or notification from backdoor service 180 at step 514, and then, at step 516, hypervisor 140 generates or modifies metadata for each installed application to include a callback to launch UI proxy 155 when the application is selected from unified home screen 500. For example, in one embodiment, metadata relating to a launch action for each work environment application in the list (e.g., application icon, name of the executable file for the application, etc.) is provided with the list in step 514. Because the name of the executable file for the work environment application would not be understood by host OS 120 because the file does not reside in the file system managed by host OS 120, in step 516, hypervisor may generate or modify the received metadata (e.g., to include the application icon, name of UI proxy 155, and name of the executable file for the application in the work environment as a parameter that would be understood by UI proxy 155) so that host OS 120 calls or executes UI proxy 155 as a proxy instead of calling or executing the name of the executable file for the application itself (since such a call or execution would result in an error in host OS 120 as such an executable file does not exist).

At step 518, hypervisor 140 forwards the modified metadata of the installed applications to host OS 120 so host OS 120 can display work application icons relating to the applications in the work environment. At step 520, host OS 120 receives (e.g., via the launcher application) the modified metadata of the installed applications from hypervisor 140 and displays the work application icons (e.g., received as part of the modified metadata) relating to the applications in unified home screen 500. As previously discussed above, host OS 120 (e.g., the launcher application) may further associate a call to UI proxy 155 (i.e., including a unique identifier, such as the name of the executable file for the application in the work environment receive as part of the metadata) with launch actions relating to such work application icons.

As such, in order to launch of an application residing in the work environment from unified home screen 500, at step 522, host OS 120 receives (e.g., via the launcher application) a user selection of a work application icon. Then, at step 524, host OS 120, as part of the launch action associated with the work application icon, requests UI proxy 155 to launch or wake up. The request includes a parameter (e.g., name of the executable file for the application in the work environment) identifying to UI proxy 155 the application installed in work mobile device 105 that corresponds to the work icon (hereafter referred to as the "selected application"). UI proxy 155, at step 526, launches or wakes up upon receiving such request from host OS 120. At step 528, UI proxy 155 requests hypervisor 140 to wake up work mobile device 105 and launch the selected application. Then, hypervisor 140, at step 530, wakes up work mobile device 105 by emulating power ON via VMM 145, and forwards the request to launch the selected application to backdoor service 180. At step 532, backdoor service 180 requests guest OS 170 to launch the selected application. As a result, virtual framebuffer 150 beings filling up with display data for the selected application. Asynchronously with steps 530 and 532, UI proxy 155 continually copies contents of virtual framebuffer 150 (or updates to such contents) into a local memory buffer in the personal environment in at step 534 and requests composite window manager 125 to copy contents of local buffer into hardware framebuffer 115 at step 536 so that display data of the selected application can be displayed on touch screen 101. As noted above, in some embodiments, UI proxy 155 requests composite window manager 125 to redirect hardware framebuffer 115 to receive data from virtual framebuffer 150 using hardware acceleration functions provided in personal mobile device 100 to reduce the number of copying.

As an example of another user interface that displays work and personal elements in a unified manner, FIG. 5B illustrates a display of a unified task manager 505 for active applications from both personal mobile device 100 and work mobile device 105. In this display, which appears in response to a long press on a "home" key as shown in FIG. 5B, active applications from personal mobile device 100 (e.g., a browser application 506 and music application) and active applications from work mobile device 105 (e.g., email application 507 and contacts application) are both listed.

Figure 5D:
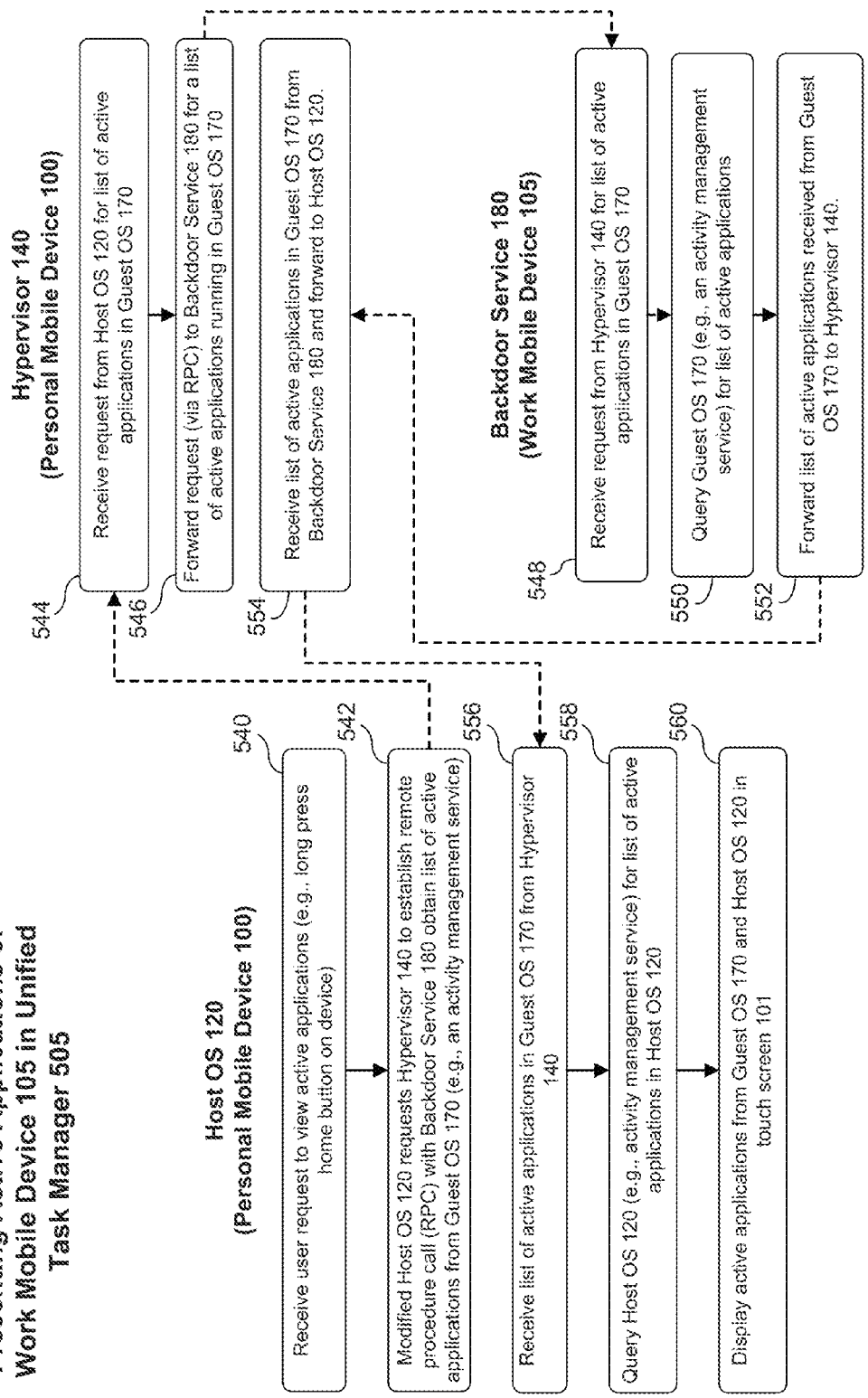
FIG. 5D is a flow diagram that illustrates the process of presenting active applications from the work mobile device in the display of the unified task manager of FIG. 5B.

FIG. 5D is a flow diagram that illustrates a process of presenting active applications from work mobile device 105 in the display of unified task manager 505 of FIG. 5B. The process includes steps carried out by host OS 120 and hypervisor 140 of personal mobile device 100, and steps carried out by backdoor service 180 of work mobile device 105. At step 540, host OS 120 recognizes a user input (e.g., long press on a home key) indicating that the user would like to view active applications. Then, at step 542, host OS 120 requests hypervisor 140 to communicate with backdoor service 180 to obtain a list of active applications running in the work environment (e.g., from an activity management service running in guest OS 170). In one embodiment, the communication channel between hypervisor 140 and backdoor service 180 is established using remote procedure call (RPC). Hypervisor 140, at step 544, receives the request from host OS 120, and at step 546, accordingly forwards the request to backdoor service 180. At step 548, backdoor service 180 receives the request forwarded by hypervisor 140 and, at step 550, queries guest OS 170 (e.g., its activity management service) for a list of active applications. At step 552, backdoor service 180 receives the list from guest OS 170 and forwards the list to hypervisor 140. Hypervisor, at step 554, receives the list forwarded by backdoor service 180 and forwards the list to host OS 120. Host OS 120 receives the list at step 556, and queries an activity management service running thereon for a list of active applications running in the personal environment at step 558. At step 560, the two lists are combined and displayed together in touch screen 101, as depicted in FIG. 5B.

Figure 6B:
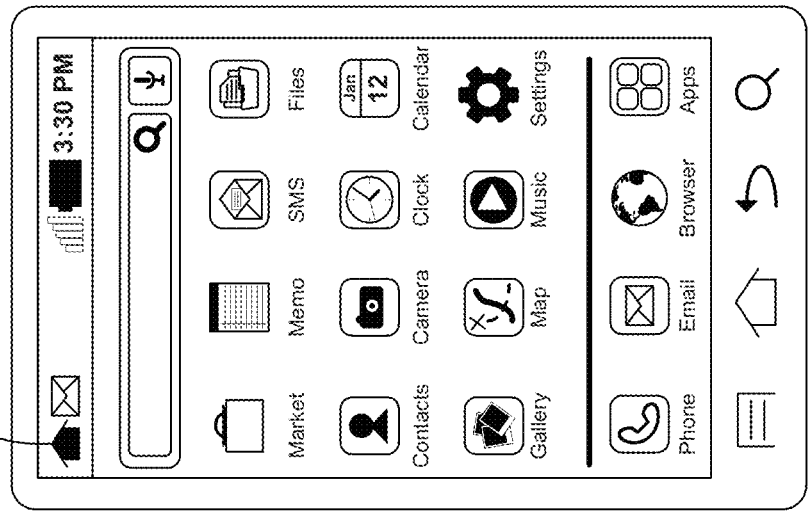
FIG. 6B illustrates a user interface for the work mobile device that includes a notification bar having a personal icon for switching the user to the personal mobile device.
Figure 6A:
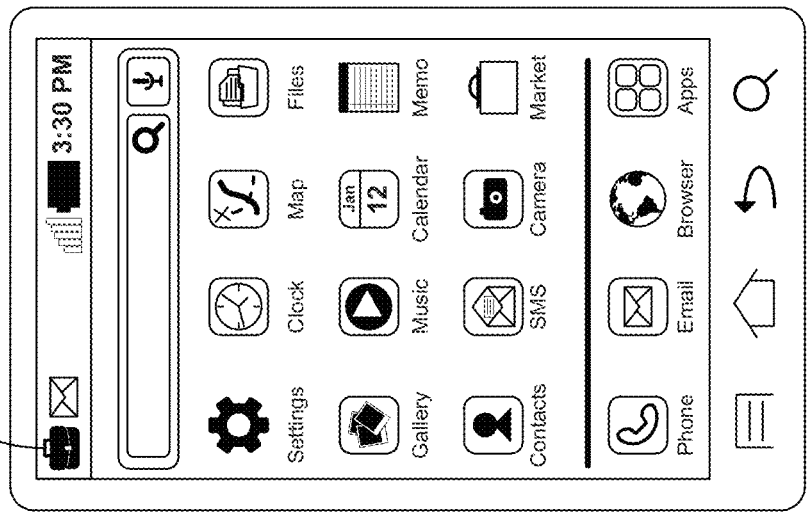
FIG. 6A illustrates a user interface for the personal mobile device that includes a notification bar having a work icon for switching the user to the work mobile device.

In addition to switching between personal and work environments utilizing work and personal icons as in FIG. 2 or swiping motions as in FIG. 4 or utilizing a unified home screen as in FIG. 5A, alternative embodiments may utilize other techniques to switch between personal and work environments. FIGS. 6A and 6B illustrate another alternative user interface for such switching. In FIG. 6A, personal mobile device 100 includes a notification bar 220 having a work icon 600 for switching the user to work mobile device 105. Similarly, FIG. 6B illustrates a user interface for work mobile device 105 that includes notification bar 220 having a personal icon 605 for switching the user to personal mobile device 100. In both cases, by, for example, swiping down on notification bar 220 to expand it, a user can subsequently select work icon 600 or personal icon 605 to switch to the work environment or personal environment, respectively. In one embodiment, when UI proxy 155 is launched or woken up to provide hardware framebuffer 115 with the work desktop 215 (as further detailed in steps 306, 308, 322 and 324 of FIG. 3A), UI proxy 155 may additionally transmit a notification request to host OS 120 requesting a display of personal icon 605 in notification bar 220, that when selected by the user, switches the user from the work environment to the personal environment in a manner similar to the steps of FIG. 3B. Similarly, when a user selects personal icon 605 to switch to the personal environment, the termination of UI proxy 115 as described in steps 340-342 in FIG. 3B may include an additional step to request host OS 120 to display work icon 600 in notification bar 220, that when selected by the user, switches the user back to the work environment in a manner similar to the steps of FIG. 3A.

In addition to the challenges of switching between personal and work environments as discussed above, there also exist challenges for a user to be reminded whether he is currently accessing an application launched from the work or personal environment once that application has been launched. As such, FIGS. 7A and 7B are schematic illustrations of a mobile computing device that is configured in different ways to notify a user of the environment the user is working in. The notification mechanisms described herein are useful because an application that a user has launched often occupies the entire display area and separate instances of the application may be available in both the personal and work environments. As a result, the user may not be recall the environment from which the application was launched.

The notification mechanism shown in FIG. 7A is a lighted trackball 701 that turns to one color, e.g., green, when an application is launched from the personal environment, and turns to another color, e.g., blue, when an application is launched from the work environment. The notification mechanism shown in FIG. 7B is a colored backlight 702 that appears around the border of the application. The backlight turns to one color, e.g., green, when an application is launched from the personal environment, and turns to another color, e.g., blue, when an application is launched from the work environment.

Access to personal and work environments also pose challenges from a security perspective. In particular, it may be desirable to streamline access to personal and work environments by minimizing repetitive access to lock screens for both personal and work environments while switching between the environments. As previously discussed, in certain embodiments, a work password may be sufficient to provide access to both the personal and work environments. As such, FIGS. 8A-8C each illustrate a lock screen of personal mobile device 100 and a different process for entering either the personal mobile device or the work mobile device from the lock screen. Lock screen 800 of FIG. 8A requires an entry of password and a swipe for entry into either the personal environment or the work environment. The entry of the correct personal password combined with a right-to-left swipe provides access to the personal environment. In contrast, the entry of the correct work password combined with a left-to-right swipe provides access to the work environment. Lock screen 805 of FIG. 8B requires an entry of different passwords for entry into the personal environment and the work environment. The entry of the correct personal password (without any additional swipe motions) provides access to the personal environment while the entry of the correct work password (without any additional swipe motions) provides access to the work environment. Lock screen 810 of FIG. 8C requires an entry of different patterns for entry into the personal environment and the work environment. The entry of the correct personal pattern provides access to the personal environment while the entry of the correct work pattern provides access to the work environment.

Figure 8A:
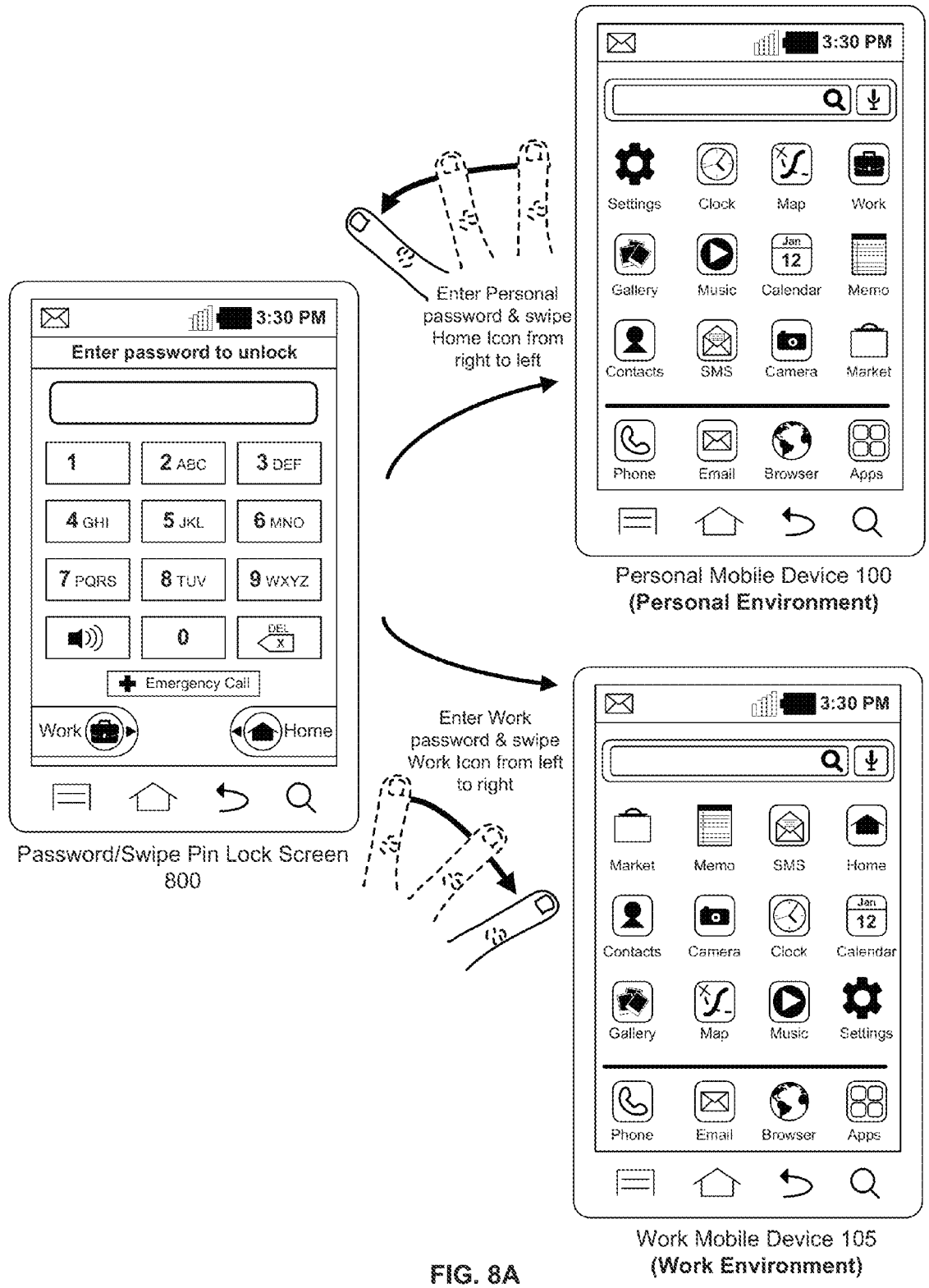
FIGS. 8A, 8B, and 8C each illustrate a lock screen of a mobile computing device and a different process for entering either the personal mobile device or the work mobile device from the pin lock screen.
Figure 8B:
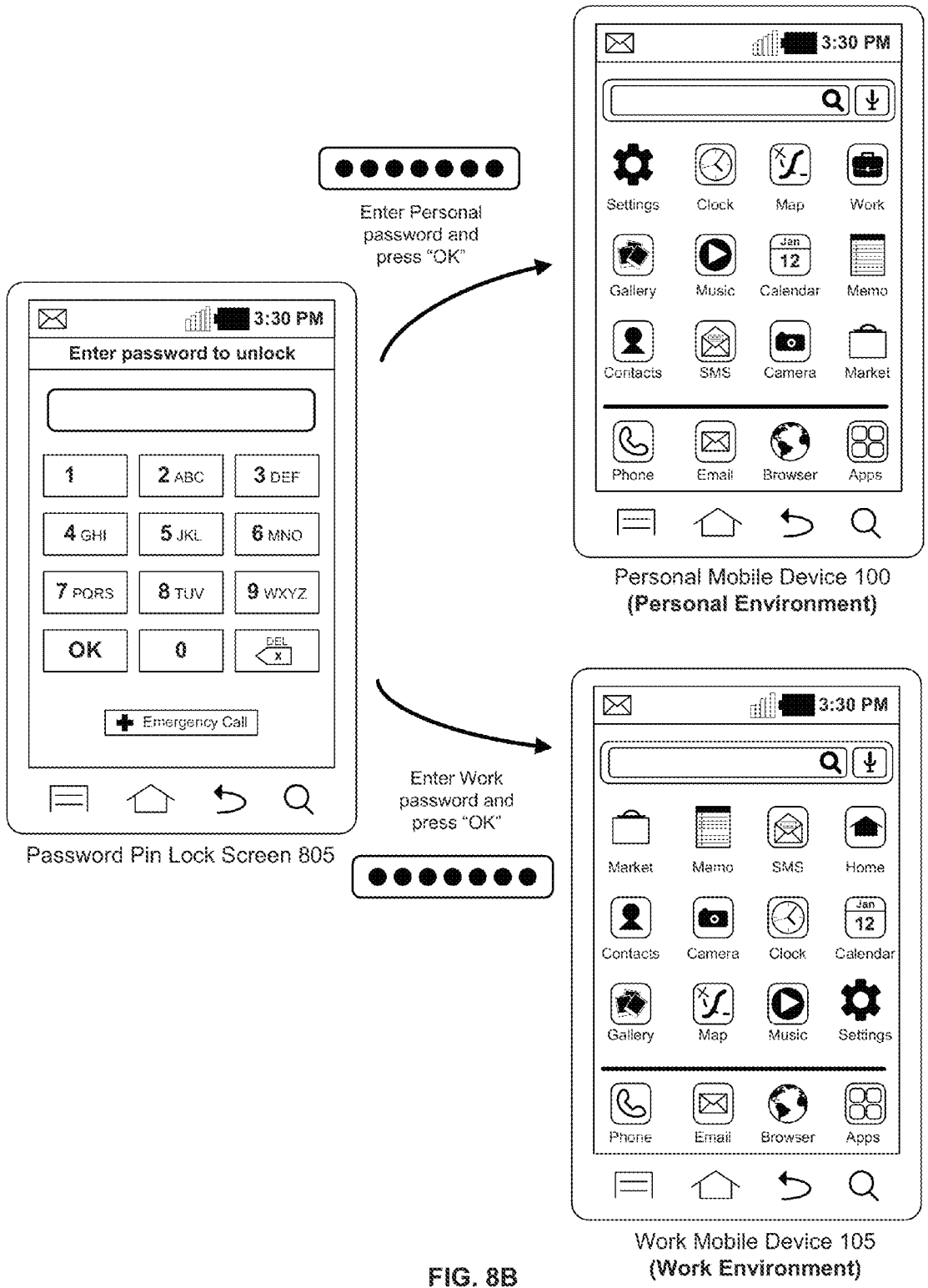
Figure 8C:
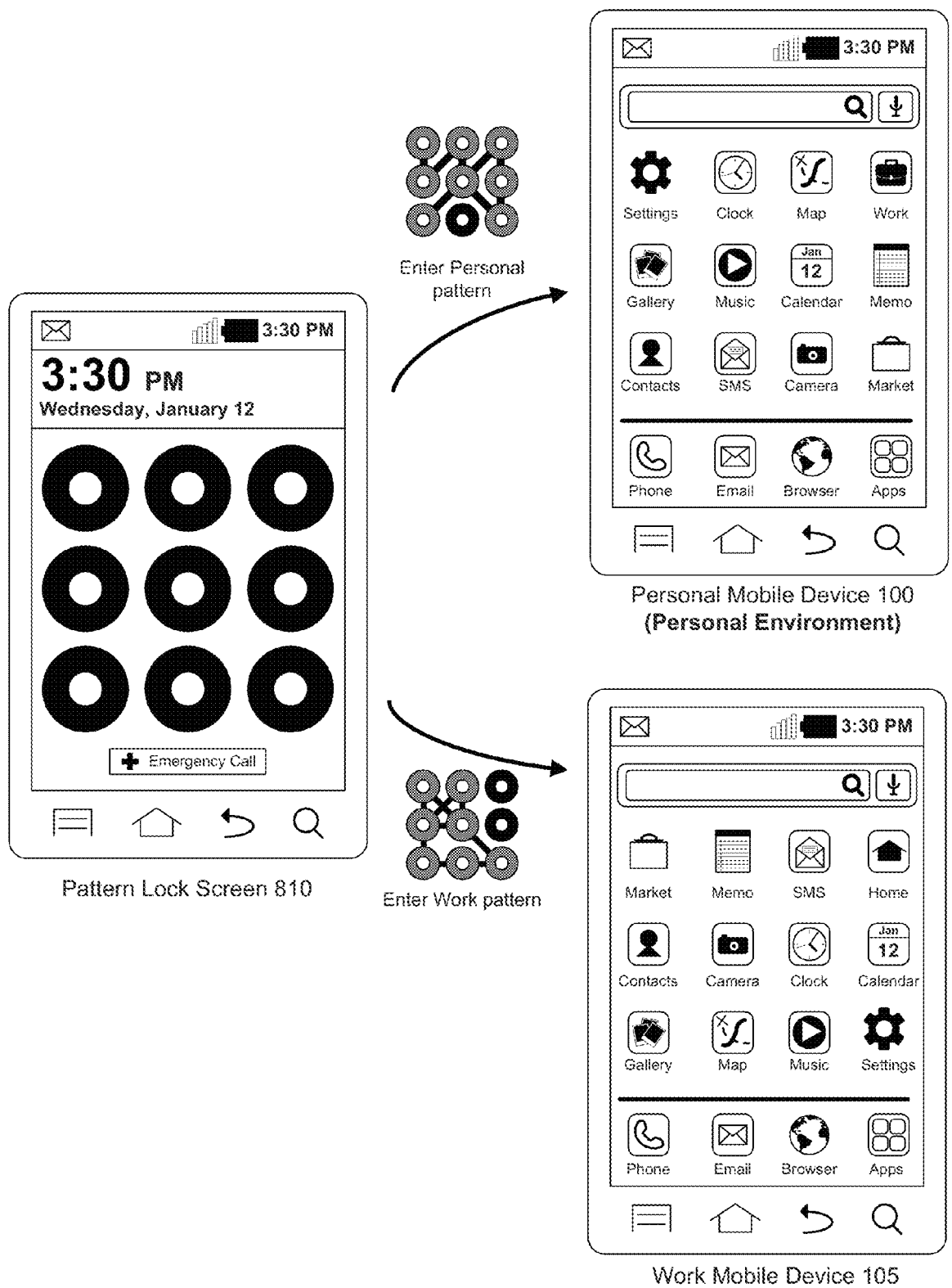
Figure 9:
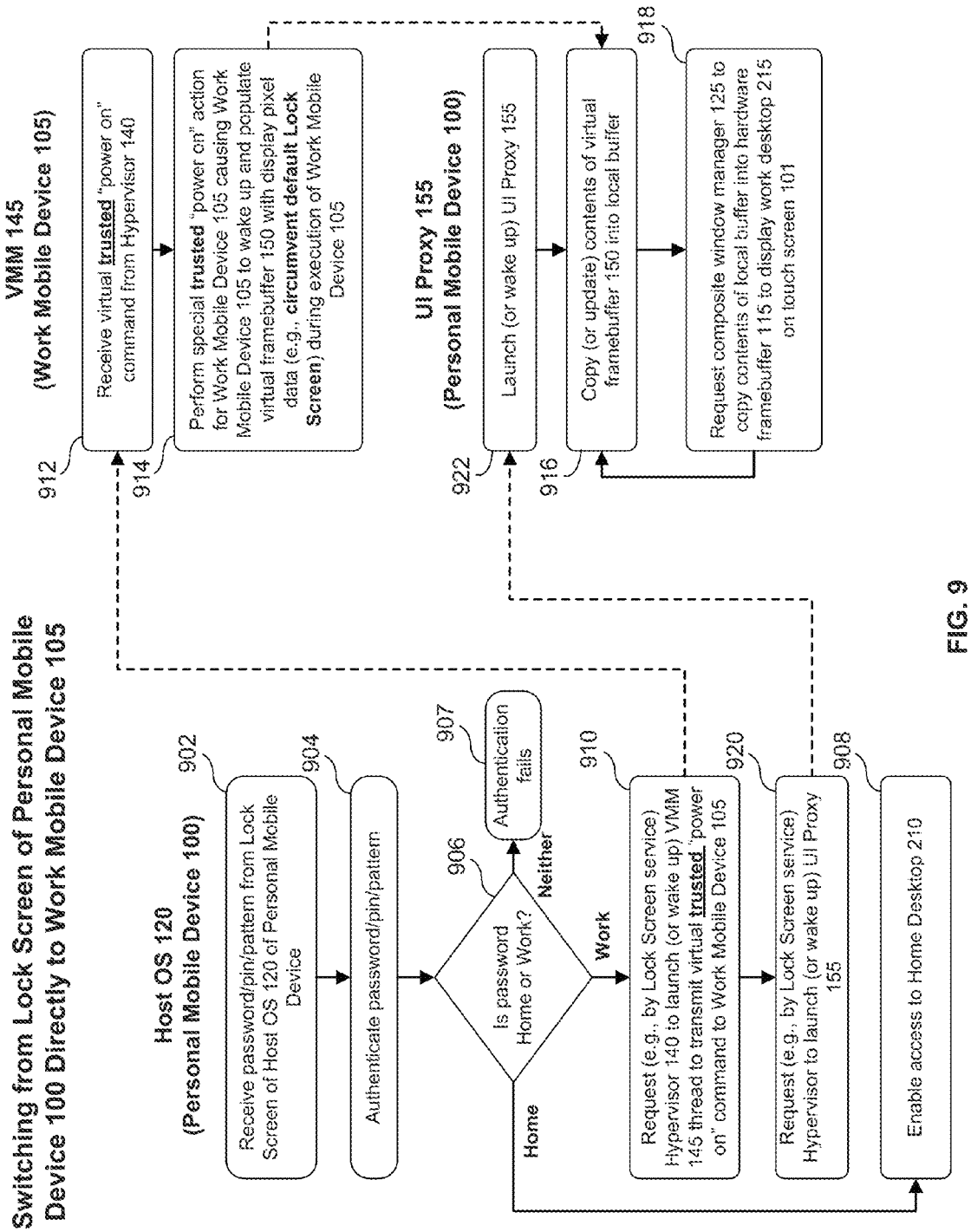
FIG. 9 is a flow diagram that illustrates the process for directly accessing the work mobile device from a lock screen of a mobile computing device.

FIG. 9 is a flow diagram that illustrates a process for directly accessing work mobile device 105 from a lock screen presented by personal mobile device 100 such as those lock screens depicted in FIGS. 8A-8C. It should be recognized, however, that alternative embodiments may utilize different lock screens with different swiping motions (e.g., up-down motions, diagonal motions, etc.) or alternative user interactions. The process includes steps carried out by host OS 120 and UI proxy 155 of personal mobile device 100, and steps carried out by VMM 145 of work mobile device 105. The process begins at step 902, when host OS 120 receives a user credential (e.g., password or pattern) through the lock screen. Host OS 120 carries out the step of authenticating the user credential at step 904. If the authentication is unsuccessful the process fails at step 907. If the authentication is successful in step 904, host OS 120 determines at step 906 whether the user credential is valid for accessing the personal environment and, if so, provides access to the personal environment at step 908. If host OS 120 determines at step 906 that the user credential is valid for accessing the work environment, then steps 910-922 are carried out.

At step 910, host OS 120 requests hypervisor 140 to launch or wake up a thread for VMM 145 to transmit a virtual power ON command to work mobile device 105. The action taken by host OS 120 in step 910 is to analogous to the action taken by host OS 120 in step 308 of FIG. 3A, however, because host OS 120 has already authenticated the user through the lock screen presented by personal mobile device 100 in steps 902-906, host OS 120 is able to transmit a "trusted" request to hypervisor 140 rather than requesting hypervisor to yet again present a lock screen to the user to access work mobile device 105 as in step 308 of FIG. 3A. At step 912, the trusted request is received by VMM 145. Then, at step 914, VMM 145 causes work mobile device 105 to wake up and begin populating virtual framebuffer 150 with display data for the work environment (e.g., similar to step 320 of FIG. 3A). UI proxy 155 then continually copies contents of virtual framebuffer 150 (or updates to such contents) into local memory buffer in personal mobile device 100 at step 916 and requests composite window manager 125 to copy contents of the local memory buffer into hardware framebuffer 115 at step 918 so that display data for the work environment can be displayed on touch screen 101. Asynchronously with steps 912-918, steps 920 and 922 are carried out after step 910. At step 920, host OS 120, requests hypervisor 140 to launch or wake up UI proxy 155 (e.g., so that UI proxy 155 is able to perform steps 916-918) and at step 922, UI proxy 155 is launched or woken up. It should be recognized that in the embodiment as described above, the work password is authenticated by host OS 120. In alternative embodiments, the work password may still be captured by lock screen presented by host OS 120 (e.g., step 902) but instead is passed to and authenticated by guest OS 170 once work mobile device 105 has been powered on.

Figure 10:
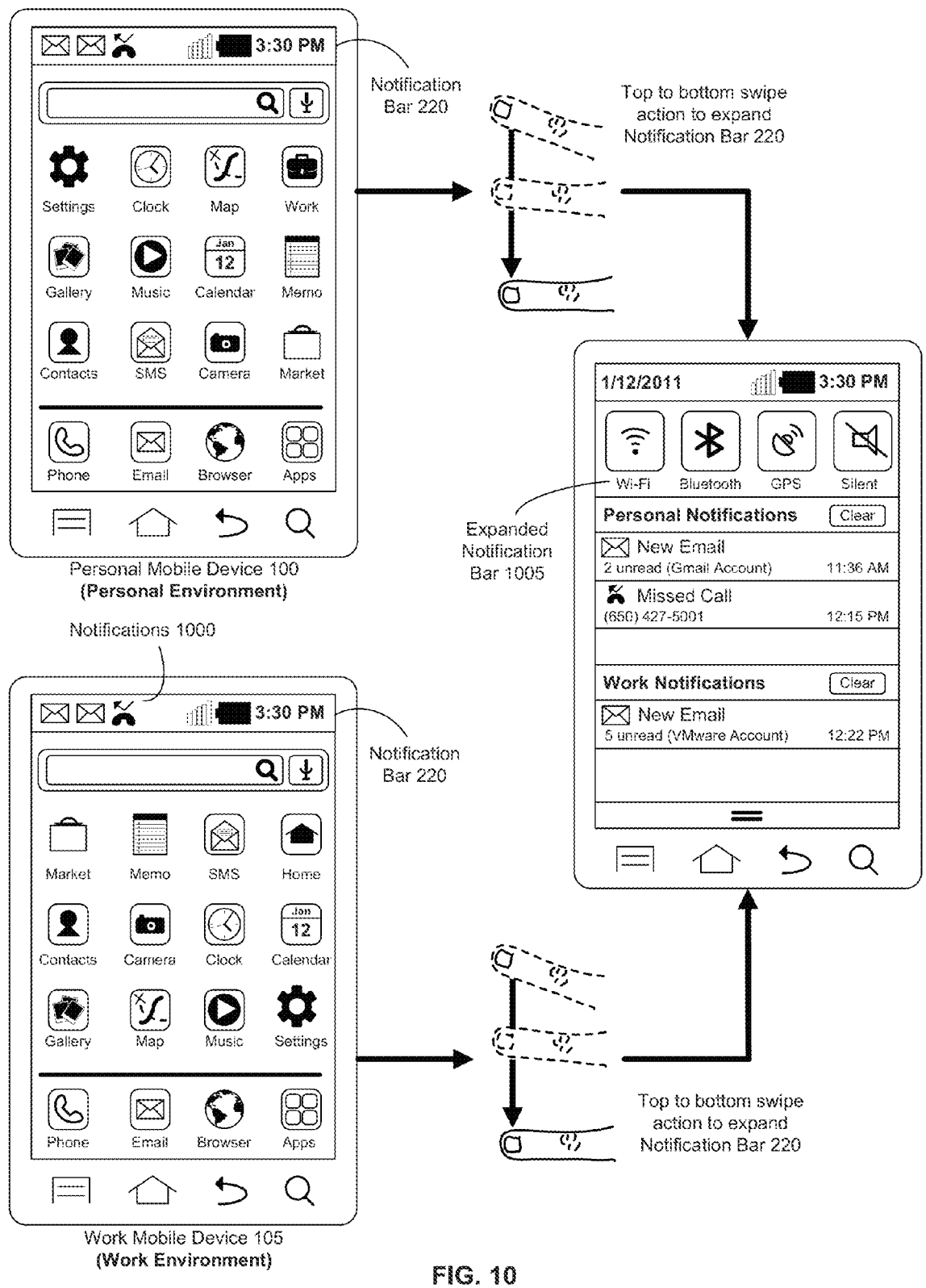
FIG. 10 illustrates user interfaces for the personal mobile device and the work mobile device each including a notification bar, a process for expanding the notification bar from the personal mobile device and the work mobile device, and an expanded notification bar.

In addition to the user interface challenges posed by switching between personal and work environments as well as by repetitive lock screens, additional challenges arise when ensuring that notifications generated by applications in the work environment are properly received while the user is working in the personal environment (and vice versa). As previously discussed, in an embodiment such as that depicted in FIG. 2, the same notification bar 220 that is generated and managed by host OS 120 is displayed regardless of whether the user is in the personal or work environment. FIG. 10 further details how such a notification bar 220 may receive notifications as well as how it may display detailed information regarding the notifications when expanded by the user. In particular, FIG. 10 depicts a notification bar 220 that is displayed on both personal mobile device 100 and work mobile device 105 and includes notifications 1000 (on the left side of notification bar) generated from individual applications that are running in either personal mobile device 100 or work mobile device 105 (as well notifications that are displayed on the right side of the notification bar relating to system-level functions such as time, battery life and network signal strength, which are typically common to both the personal and work environments). As depicted, notifications 1000 include a notification of new email from an email application in the personal environment, a notification of new email from an email application in the work environment, and a missed call notification from a phone application in the personal environment.

As illustrated in FIG. 10, a top-to-bottom swipe on notification bar 220 expands notification bar 220 to provide further details regarding displayed notifications (as well as enables the user to further launch applications related to such notifications by selecting the notifications in the expanded view). In the embodiment of FIG. 10, expanded notification bar 1005 provides additional details on the notifications, including whether the notification is generated from the personal or work environments. It should be recognized that although the embodiment of FIG. 10 displays separate lists corresponding to notifications 1000 generated by applications in the personal or work environments, other alternative embodiments may utilizes other techniques to distinguish between notifications generated from the different environments, including color-coding the notifications.

Figure 11:
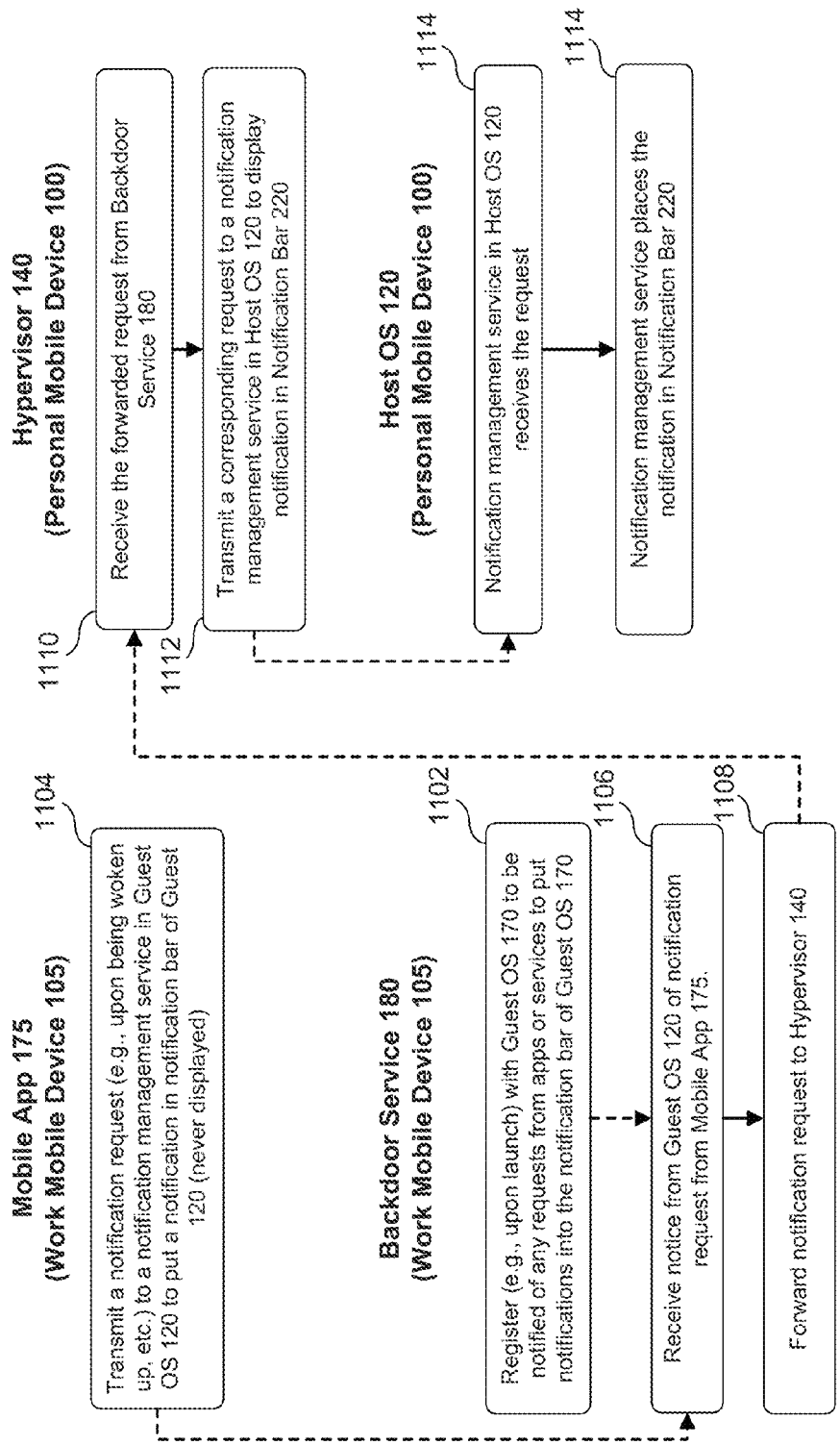
FIG. 11 is a flow diagram that illustrates the process for receiving and presenting notifications received from the work mobile device.

FIG. 11 is a flow diagram that illustrates a process for receiving and presenting notifications received from applications running in work mobile device 105 in notification bar 220. The process is executed regardless of whether work mobile device 105 is in the foreground or in the background because, as described earlier, display data for notification bar 220 is controlled and managed by host OS 120. The process includes steps carried out by an application 175 whose activity is prompting a notification to be displayed in notification bar 220 and a backdoor service 180, both of work mobile device 105, and steps carried out by hypervisor 140 and host OS 120 of personal mobile device 100.

In accordance with the embodiment of FIG. 11, in step 1102, background service 180 generally registers (for example, upon launch) with guest OS 170 (or with its notification management service) to be notified of any requests from other applications or services running on guest OS 170 that request guest OS 170 to present notifications in a notification bar controlled by guest OS 170 (which as discussed above, is actually not displayed or rendered on touch screen 101, since notification bar 220 controlled by host OS 220 is always displayed). As such, when, at step 1104, some activity at application 175 prompts application 175 to request a notification to be displayed in notification bar 220 (e.g., an email application may have received new email, a calendar application may have an imminent appointment upcoming, a telephone call may have been missed, etc.), backdoor service 180 receives notice of the notification request of application 175 from guest OS 170 at step 1106. At step 1108, backdoor service 180 forwards the notification request to hypervisor 140. Hypervisor 140, at step 1110, receives the forwarded notification request and, at step 1112, transmits a corresponding request to a notification management service in host OS 120 to display the requested notification in notification bar 220. In one embodiment, such a corresponding notification request includes information to associate the notification with hypervisor 140 and a tag uniquely identifying the notification (e.g., name of application 175 in work mobile device, etc.) so that, upon user selection of the notification, hypervisor 140 can assist with launching the corresponding application 175 running in work mobile device 105. The notification management service of host OS 120 receives the forwarded notification request at step 1114. Then, at step 1116, the notification management service of host OS 120 displays the requested notification in notification bar 220. Subsequently, when a user (whether working in the personal or work environment) expands notification bar 220 (e.g., as depicted in FIG. 10) and selects the displayed notification, host OS 120 (or its notification management service), utilizing the information provided by hypervisor 140 in the corresponding notification request at step 1112, calls hypervisor 140 and provides it with the unique tag identifying application 175, thereby enabling hypervisor 140 to request backdoor service 180 to launch or wakeup application 175 in work mobile device 105 (and, if needed, "power on" work mobile device 105 via UI proxy 155 to display application 175 in work mobile device 105).

Figure 12A:
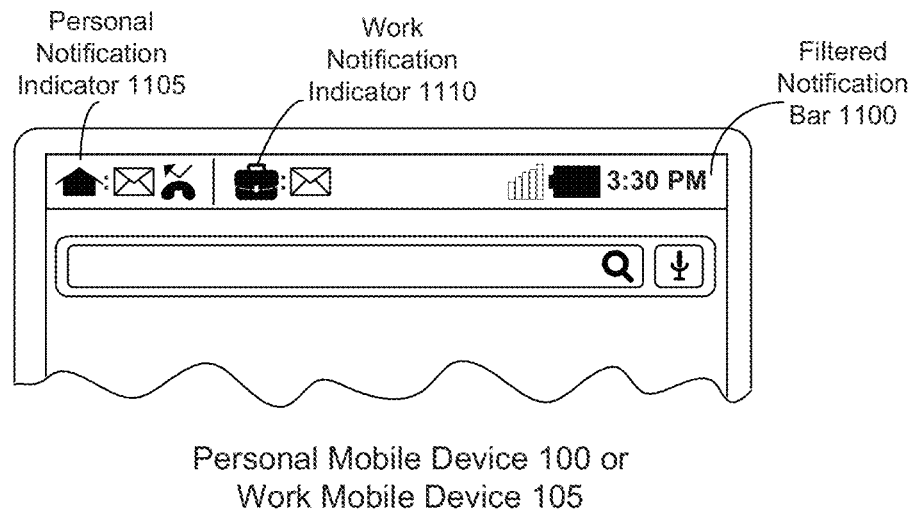
FIGS. 12A, 12B, and 12C each illustrate a different embodiment of the notification bar.
Figure 12B:
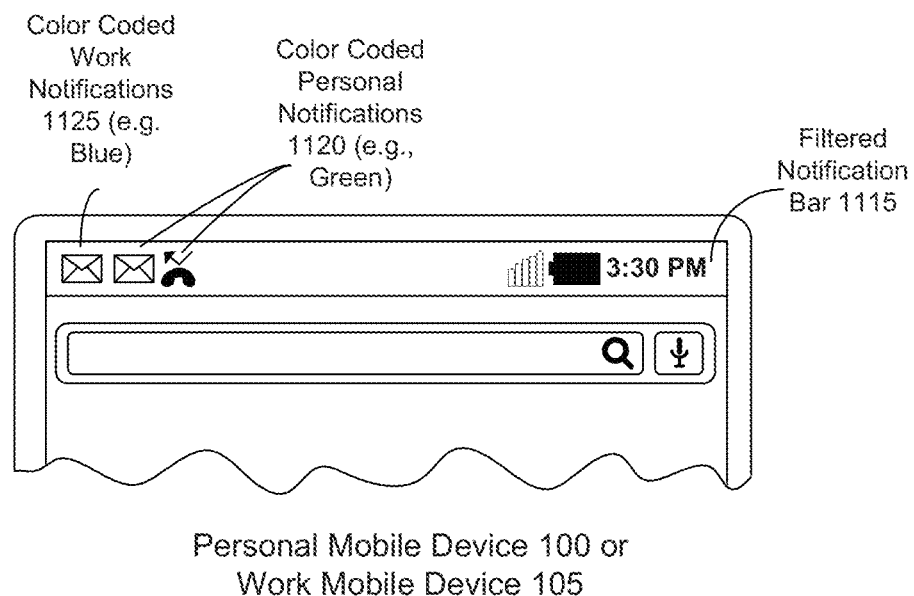
Figure 12C:
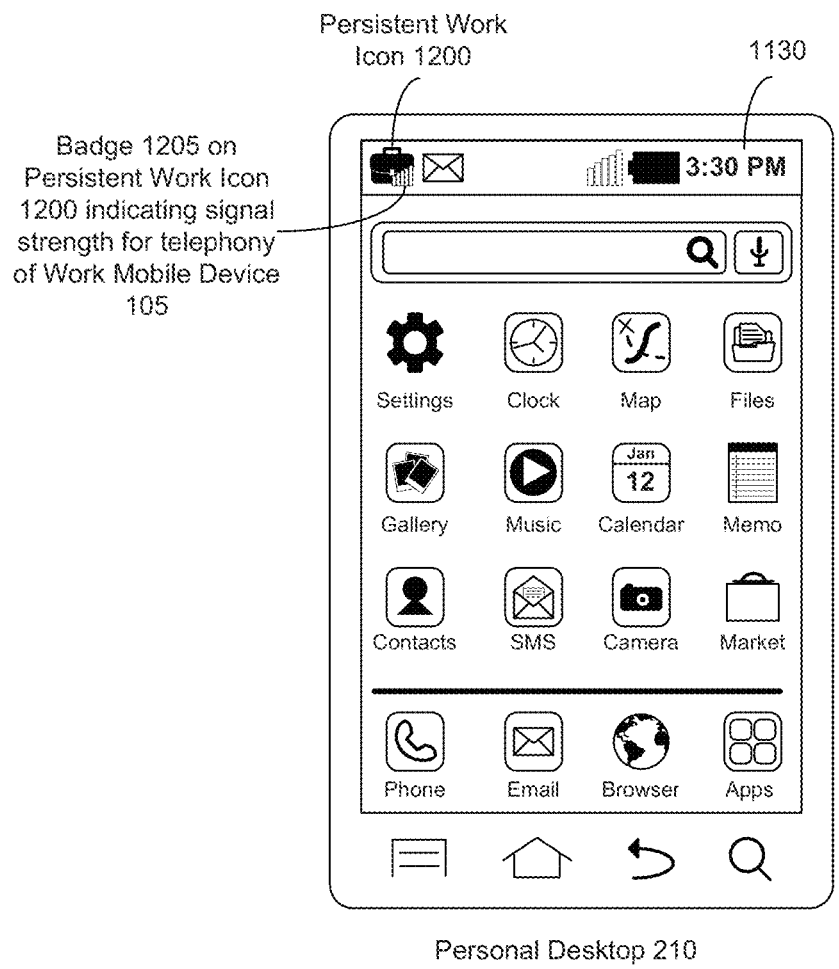

In addition to the leveraging the pre-existing structure and functionality of notification bar 220 of personal mobile device 100 to present notifications for both work and personal environments as previously discussed above, alternative embodiments may enhance the functionality of notification bar 220 or otherwise implement an entirely new notification bar (and notification management system) that is aware of the distinctions between personal and work environments. FIGS. 12A-12C each illustrate examples of different embodiments of such notification bars. FIG. 12A illustrates a "filtered" notification bar 1100 that separates personal notifications and work notifications. A personal notification indicator 1105 helps the user identify the personal notifications, and a work notification indicator 1110 helps the user to identify work notifications. FIG. 12B illustrates a similar filtered notification bar 1115 having personal notifications 1120 and work notifications 1125 that are differentiated by color. All personal notifications are displayed in one color, e.g., green, and all work notifications are displayed in another color, e.g., blue.

In certain scenarios, system-level notifications such as network signal strength that are typically displayed on the right side of a notification bar and can shared between the personal and work environments may be different for such environments. For example, in one such scenario, personal mobile device 100 may have a phone number that accesses the telephony services of one carrier while work mobile device 105 may have a different phone number that accesses the telephony services of a different carrier. At any particular geographic location, the cellular signal strengths of the two carriers may differ. As such, FIG. 12C illustrates a filtered notification bar 1130 that displays a "persistent" work icon 1200 with one or more "badges," where the badges may relate to system-level status information particular to work mobile device 105. As shown in FIG. 12C, a badge 1205 is overlaid on persistent work icon 1200 to indicate signal strength for a cellular network of a carrier utilized by work mobile device 105 (which is different than the carrier used by personal mobile device 100). It should be recognized that the particular user interfaces relating to notifications in FIGS. 10-12C are merely exemplary and other user interfaces may be utilized consistent with the teaching herein. For example, alternative embodiments may offer audio notifications that can be configured to produce different sounds depending on the source of the notification (e.g., personal or work environments). Similarly, notifications via vibrations may be configured to produce different vibration patterns depending on the source of the notification. Color notifications through trackballs or LEDs are also possible, where different colors are assigned to personal and work notifications, respectively.

Figure 13A:
FIG. 13A illustrates a calendar application running in a mobile computing device with no filtering of calendar information between the personal and work mobile devices.

In addition to user interface challenges as previously discussed relating to switching between work and personal environments, streamlining secured access through lock screens and presenting notifications, there also exist other user interface challenges when there is a desire to provide some level of access to data in the work environment or personal environment while the user is operating in the other environment. For example, a user may find it desirable to access work-related appointments stored in the work environment while accessing his personal calendar application in the personal environment (i.e., without completely switching environments and applications). As such, FIG. 13A illustrates a calendar application 1300 running in a mobile computing device (either in the personal or work environment) with no filtering of calendar information between personal and work environments. Calendar application 1300 is referred to as "unified" calendar application because appointments and other calendar events are openly shared between personal mobile device 100 and work mobile device 105.

Figure 13B:
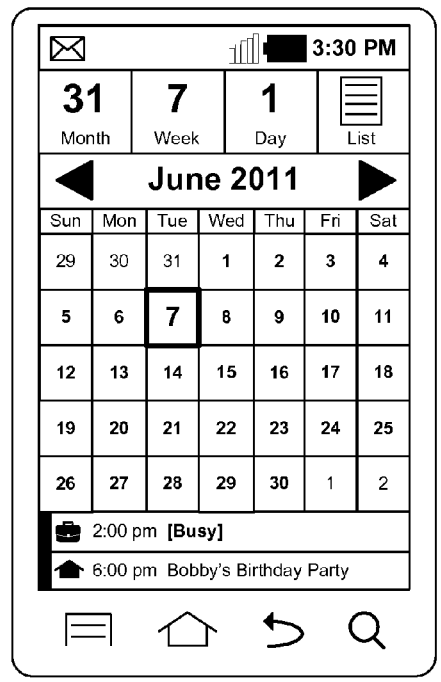
FIG. 13B illustrates a calendar application running in a personal mobile device of a mobile computing device with partial filtering of calendar information from the work mobile device.
Figure 13C:
FIG. 13C illustrates a calendar application running in a work mobile device of a mobile computing device with partial filtering of calendar information from the personal mobile device.

However, an embodiment as illustrated in FIG. 13A may be inconsistent with an employer's security policies. For example, the user's employer may consider certain information that may be revealed when accessing a work-related appointment (e.g., colleague email addresses, confidential subject headings, etc.) to be confidential. Similarly, a user may consider certain information in personal-related appointments to be inappropriate in the work environment, particularly if the user's work-related calendar can be accessed by other employees. As such, FIGS. 13B and 13C illustrate embodiments a unified calendar applications that further implement "partial sharing" of information between the personal and work environments. As depicted in FIG. 13B, a unified calendar application 1305 in the personal environment does not provide any details regarding a time slot that has been occupied with a work-related appointment other than an indication that the time slot is "Busy" with a work related appointment. Similarly, a unified calendar application 1310 in the work environment, as depicted in FIG. 13C, does not provide any details regarding a time slot that has been occupied with a personal-related appointment other than an indication that the time slot is "Busy" with a personal-related appointment.

It should be recognized that the calendar application examples depicted in FIGS. 13A-13C are merely exemplary and that calendar information is just one type of information that can be shared between the personal and work environments at varying levels of detail. For example, contact information is another type of information that can be similarly considered. A user operating in the personal environment may see the names and phone numbers of contacts maintained within work mobile device 105, but may be blocked from obtaining the contact's job title and e-mail address. As such, if a telephone call comes in through the user's personal line but from a work contact, there is sufficient information sharing between the two environments that the work contact can be identified as the originator of the call. Another example where some contact information sharing between the two environments may be useful is telephone calls originated by the user from the personal environment to a work contact or from the work environment to a personal contact. In such cases, there should be a transparent switch in environments so that a telephone call to a personal contact should use the personal wireless subscription plan and a telephone call to a work contact should use the work wireless subscription plan. Another example of an application that can benefit from levels of sharing between personal and work environments are multimedia applications such as a picture gallery application. For example, an employer may allow images from a work-related picture gallery to be accessed by a personal-related picture gallery at lower resolution. For example, if the user's work-related picture gallery includes confidential and detailed architectural designs, a low resolution version of designs that are accessible in the personal environment will not compromise the confidentiality of the designs since the low resolution version will not provide sufficient detail.

Figure 14:
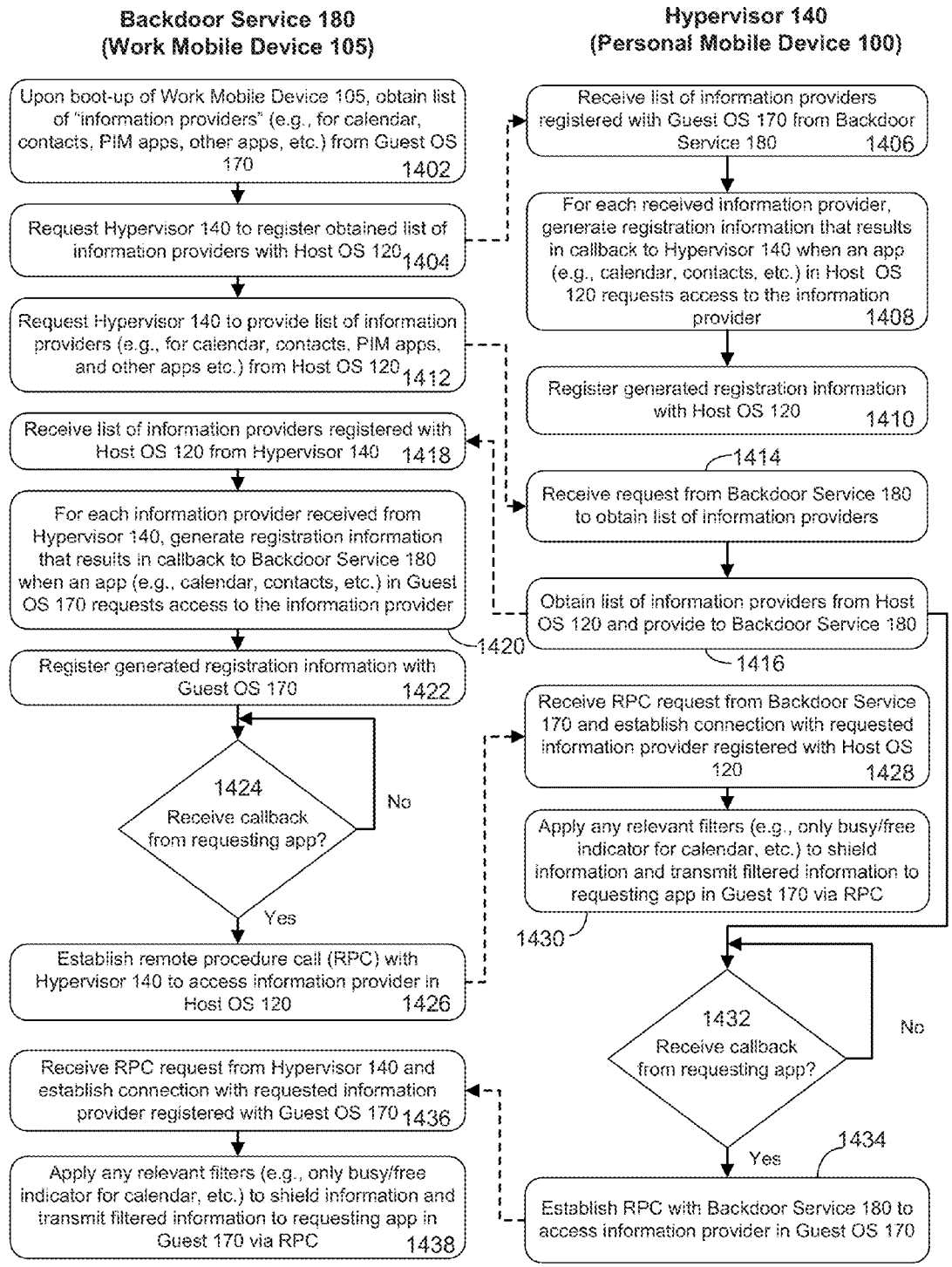
FIG. 14 is a flow diagram that illustrates the process for sharing information between personal and work mobile devices.

FIG. 14 is a flow diagram that illustrates a process for sharing information between corresponding applications in personal mobile device 100 and work mobile device 105 to achieve user interface functionality similar to FIGS. 13A-13C. The process includes steps carried out by a backdoor service 180 of work mobile device 105, and steps carried out by hypervisor 140 of personal mobile device 100.

At step 1402, backdoor service 180 (e.g., upon work mobile device 105 being powered on) obtains a list of available "information providers" from guest OS 170. Such information providers can be local databases or remote data sources that a user may register with a particular application to access. For example, with respect to an email application, information providers may be the employer's email server or the user's online email account. With respect to a calendar or contacts application, information providers may be a local calendar or contacts database on the device, the employer's PIM server or the user's calendaring functions in his online email or social network account. At step 1404, backdoor service 180 requests hypervisor 140 to register the obtained list of information providers with host OS 120. When, at step 1406, hypervisor 140 receives the list of information providers from backdoor service 180, then, at step 1408, hypervisor 140 generates (or modifies information obtained from the list of information providers) registration information to provide to host OS 120 to register the list of information providers from the work environment for access by applications running in the personal environment and, at step 1408, provides such registration information to host OS 120. In one embodiment, generating such registration involves associating hypervisor 140 (e.g. via a callback) with the information provider, such that when an application (e.g., calendar application, contacts application, etc.) in the personal environment requests information from the information provider, host OS 120 calls hypervisor 140 to assist in reaching the information provider in the work environment (e.g., by serving as a stub for an RPC communication with backdoor service 180, etc.).

At step 1412, backdoor service 180 also request hypervisor 140 to provide a list of information providers originating from host OS 120 so that these information providers can be made available for access by applications running on guest OS 170 in the work environment. When hypervisor 140 receives this request at step 1414, it obtains the list of information providers registered with host OS 120 and provides it to backdoor service 180 in step 1416. When, at step 1418, backdoor service 180 receives the list of information providers from hypervisor 140, then, in a manner similar to that performed by hypervisor 140 in step 1408, backdoor service 180 generates registration information (at step 1420) for the received list of information providers that it uses to register the information providers with guest OS 170 (at step 1422) so that that backdoor service 180 gets called by guest OS 170 to assist in reaching the information provider in the personal environment (e.g., by serving as a stub for an RPC communication with hypervisor 140, etc.) when an application in the work environment requests information from such information provider.

Once hypervisor 140 registers information providers from the work environment in the personal environment in step 1410 and backdoor service 180 registers information from the personal environment in the work environment in step 1422, then applications in each environment will have access to information providers in the other environment. For example, if the calendar application in the work environment requests access to the local calendar database in the personal environment (e.g., an information provider), then backdoor service 180 will accordingly receive a callback in step 1424 and, in step 1426, will establish a communication channel (e.g., RPC) with hypervisor 140 in order to establish a connection with the local calendar database in the personal environment. When hypervisor 140, at step 1428 establishes the communication channel with backdoor service 180 and connects to the local calendar database, then, at step 1430, if required (as in the embodiment of FIG. 13C), hypervisor 140 applies any relevant filters to the information provided by the local calendar database before transmitting it to the calendar application in the work environment (via the RPC channel with backdoor service 180). Steps 1432-1438 depict a similar flow on the personal environment side, for example, when a contacts application in the personal environment requests access to the local contacts database in the work environment.

It should be recognized that the flow of FIG. 14 is merely exemplary of how data can be filtered and shared between the personal and work environments to provide user interface capabilities such as those depicted in FIGS. 13A-13C. In particular, FIG. 14 depicts a flow to share data between the personal and work environments when the file systems of host OS 120 and guest OS 170 are separated and cannot be accessed by the other operating system (e.g., work device image 160 which represents the virtual disk accessible by work mobile device 105 is an encrypted file stored on the file system of host OS 120, but can only be accessed by guest OS 170 and not host OS 120 due to such encryption). However, in alternative embodiments, where guest OS 170 and host OS 120 may share access to a common file system, the user interfaces depicted in FIGS. 13A-13C may be implemented in a manner different from the flow of FIG. 14.

Figure 15:
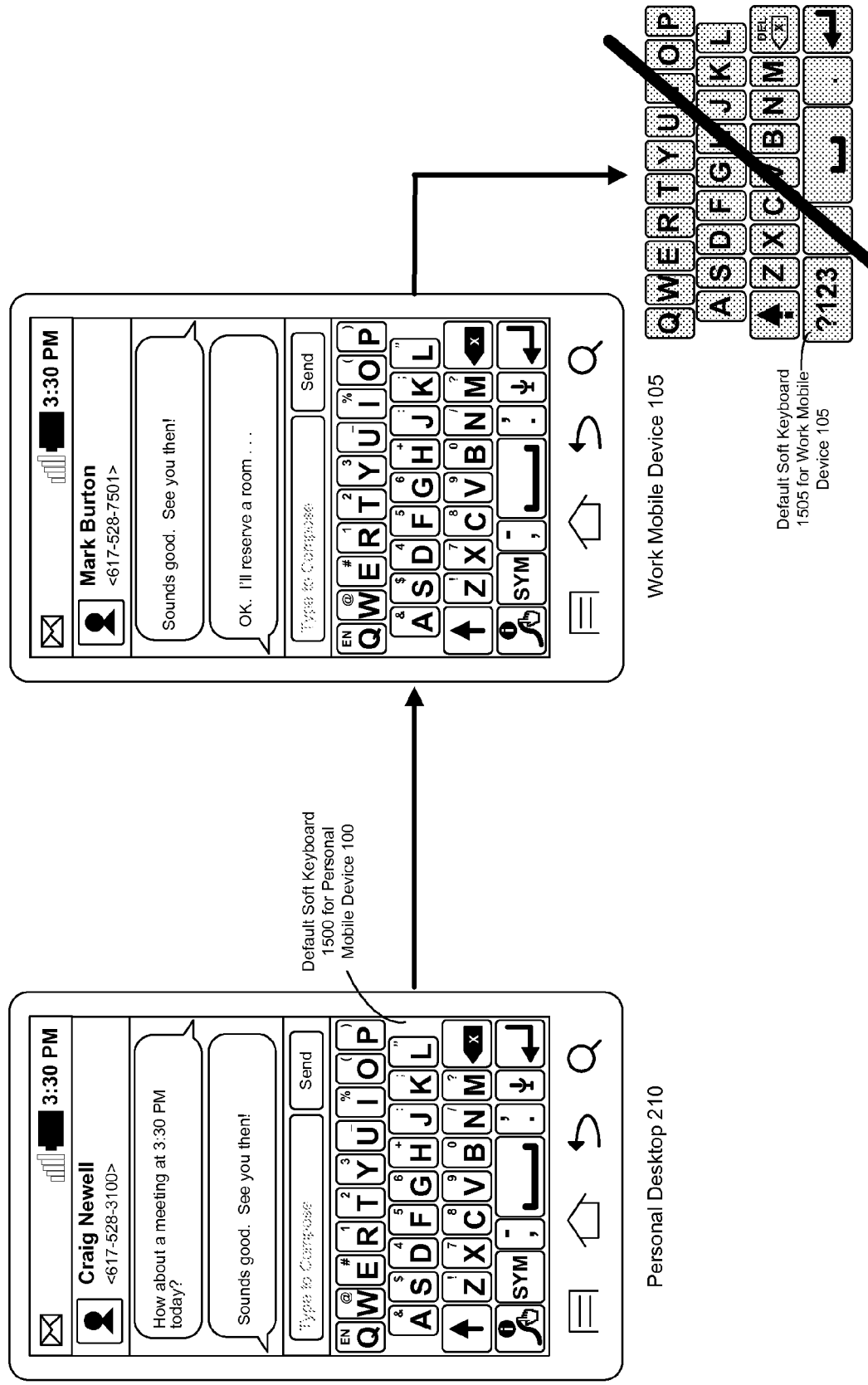
FIG. 15 illustrates a process for configuring a soft keyboard for the work mobile device to be identical to the one used in the personal mobile device.

In addition providing user interfaces that enable sharing at various levels of information between corresponding personal and work environment applications as detailed in FIGS. 13A-14, users may further find it desirable to share certain user interfaces themselves between personal and work environments. For example, once accustomed to a certain look and feel of a soft keyboard in the personal work environment, a user may desire to utilize the same soft keyboard in the work environment. As such, FIG. 15 illustrates a process for configuring a soft keyboard for work mobile device 105 to be identical to the one used in personal mobile device 100. Soft keyboard 1500 for personal mobile device 100 is shown in FIG. 15 as part of personal desktop 210. Soft keyboard 1500 may be a default soft keyboard application or a soft keyboard application acquired by other means (e.g., downloaded from an application store or market, etc.). Due to standard configurations of an employer's IT department for work device image 160, the default soft keyboard application 1505 for work mobile device 105 may not be the one 1500 used in personal mobile device 100. As depicted in the embodiment of FIG. 15, on boot-up of mobile work device 105, hypervisor 140 queries host OS 120 for its active soft keyboard application, and then uploads and installs the application package for the soft keyboard application into guest OS 170 (e.g., by providing the application package to backdoor service 180 which in turn installs the application package into guest OS 170 as the active soft keyboard for guest OS 170). It should be noted that in this particular embodiment, two separate instances of the same soft keyboard application are executing in the different environments and therefore each instance will maintain its own state within its own environment (e.g., dictionary of recognized words, etc.). As a result, if a dictionary corresponding to the soft keyboard instance in the work environment contains vocabulary for any confidential terms, the confidentiality of such terms are preserved in the work environment and are not leaked to the personal environment.

Figure 16:
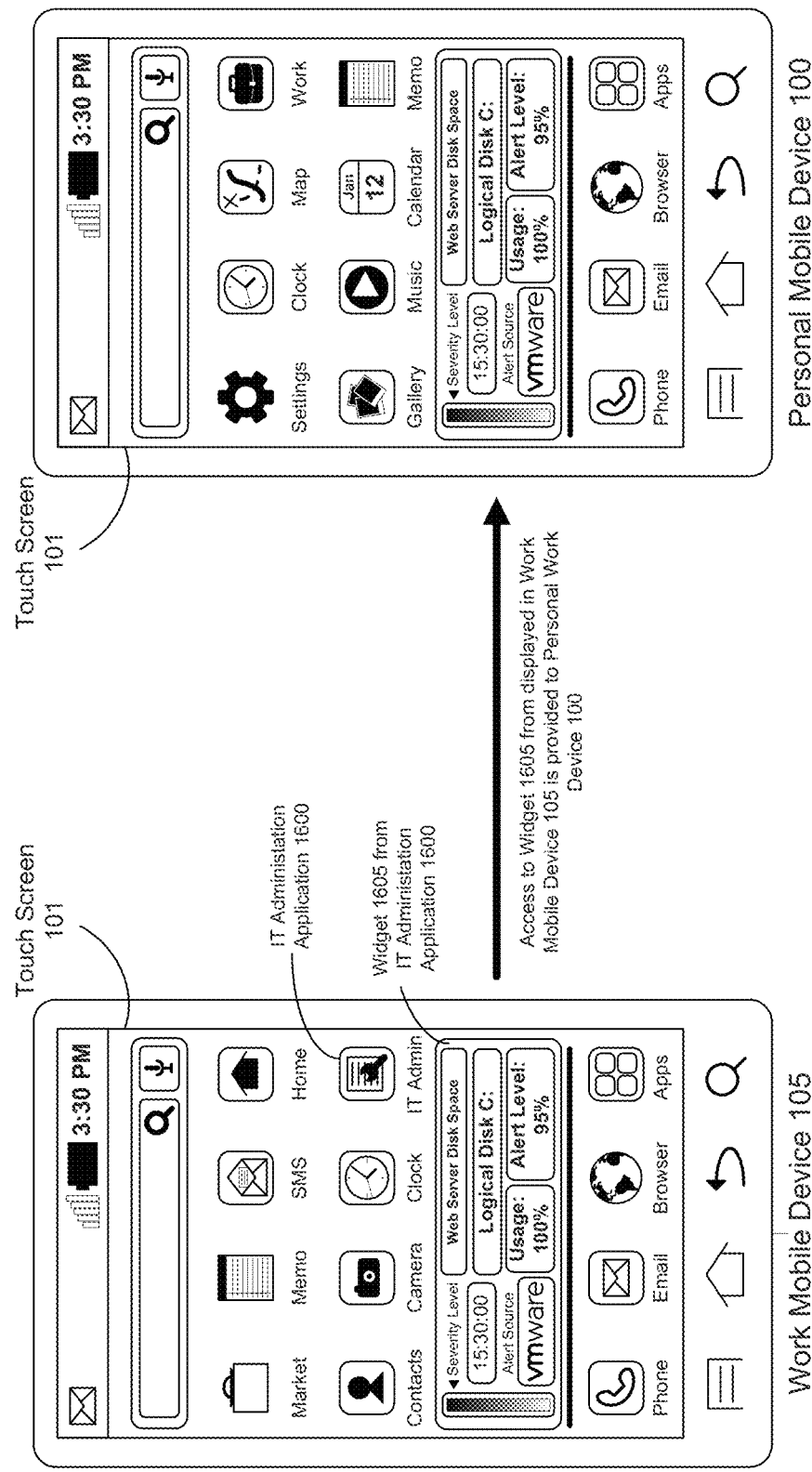
FIG. 16 illustrates user interfaces for a personal mobile device and a work mobile device, wherein widgets running in the work mobile device are displayed even when the user switches to the personal mobile device.

Similarly, users may find it desirable to view or access in one environment the user interface of a "widget" that corresponds to an application running in the other environment. For example, a user that is an IT administrator may have an IT administration application installed in his work environment that enables him to remotely manage the IT infrastructure of his employer. As is common with mobile applications, the IT administration application may include a "widget" option that can be displayed in a portion of work desktop 215 to provide a "mini" view of the status of the employer's IT systems (i.e., without launching the entire IT management application itself). As such, FIG. 16 illustrates an example of such a widget corresponding to an application in one environment that can be displayed in the other environment. As depicted, the user can not only configure IT administration application 1600 to display its widget 1605 in work desktop 215, but can also configure the personal desktop 210 in the personal environment to display the widget even though IT administration application itself is not installed in the personal environment. In order to enable the user to configure personal desktop 210 to display the widget corresponding to the IT administration application installed in the work environment, the launcher application of host OS 120 which manages and controls personal desktop 210 must be able to find and install the widget. Similar to the steps described in FIG. 14 to expose information providers in one environment to the other environment, backdoor service 180 and hypervisor 140 communicate (e.g., via RPC, etc.) to exchange information about widgets that can be displayed by the launcher applications in their respective work and personal environments. For example, upon boot-up of work mobile device 105, backdoor service 180 may provide a list of widgets from guest OS 170 to hypervisor 140. Hypervisor 140 may provide the list of widgets to host OS 120 (or its launcher application) and subsequently serve as an proxy RPC channel to communicate with backdoor service 180 (which in turn communicates with the corresponding application of the widget) when the user in the personal environment selects one of the widgets from the work environment to display on personal desktop 210. In this manner, the application in the work environment corresponding to the displayed widget in the personal environment has a RPC connection (via backdoor service 180 and hypervisor 140) to periodically transmit updated display data to the "live" widget (i.e., continuously showing updated data) displayed on personal desktop 210. It should be recognized that further features or enhancements may be added onto such a widget sharing function. For example, a sharing policy of widgets may be enforced using a white list and a black list or data displayed by widgets can be further filtered to control the level of information that can be shared.

Although one or more embodiments of the present invention have been described in some detail for clarity of understanding, it will be apparent that certain changes and modifications may be made within the scope of the claims. For example, while embodiments herein have referred to certain mobile operating systems such as Android, it should be recognized that any mobile operating systems may be utilizing in alternative embodiments such as Apple's iOS, Research in Motion's Blackberry OS, Microsoft's Windows Phone, Hewlett Packard's webOS, Symbian, Java, and the like. Similarly, embodiments herein may have referred to certain functions and components using terminology more common used in certain mobile operating systems as compared to others (e.g., launcher application, package manager application, composite window manager, etc.). It should be recognized that use of such terminology is merely exemplary not meant to limit the scope of the teachings herein to any particular operating system and that corresponding functions and components in other operating system platforms may benefit from the teachings herein. Furthermore, it should be recognized that many of the process flows described herein to achieve the user interfaces described herein may relate to embodiments that consider the functional structures, layers and limitations of current mobile operating systems and are therefore constrained the limitations of such mobile operating systems. For example, current mobile operating system do not provide support for isolating personal and work environments as currently discussed herein. As such, user interfaces herein have been described within the context of using virtualization techniques to provide a work environment as a virtual machine running a work mobile device. However, it should be recognized that alternative embodiments may not be limited to current mobile operating system limitations and may implement the user interfaces described herein by creating an entirely new mobile operating system designed to separate personal and work environments. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed:

1. A method for displaying application icons of a guest environment in a host environment of a mobile device, wherein the guest environment is running in a virtual machine supported by a hypervisor running within the host environment of the mobile device, the method comprising:
    forwarding, by a hypervisor-aware service running in the virtual machine to the hypervisor, a list of applications installed in a guest operating system (OS) of the virtual machine;
    for each of the installed applications, providing, by the hypervisor, metadata to a host OS running in the host environment, wherein the metadata comprises an application icon for the installed application and an instruction to launch a proxy application installed in the host environment upon a selection by a user of the application icon and wherein the host OS displays the application icon on a user interface (UI) of the mobile device upon receipt of the metadata;
    upon a launch of the proxy application by the host OS when a user selects the application icon on the UI of the mobile device, requesting, by the proxy application, the hypervisor to communicate with the hypervisor-aware service running in the virtual machine to launch the installed application in the guest environment;
    requesting, by the hypervisor-aware service, a list of information providers from the hypervisor, the information providers originating from the host OS; and
    generating registration information for the list of information providers, wherein the hypervisor-aware service makes at least one of the information providers available for access, based on the registration information, by the applications installed on the guest OS.

2. The method of claim 1, further comprising the steps of:
    registering, by the hypervisor-aware service, with the guest OS to receive notifications of installations of new applications in the guest environment;
    receiving, by the hypervisor-aware service, a notification from the guest OS of an installation of a new application; and
    forwarding metadata relating to the new application to the hypervisor to enable the host OS to display a corresponding icon for the new application on the UI of the mobile device.

3. The method of claim 1, wherein the hypervisor-aware service obtains the list of installed applications from a package manager component of the guest OS, the list of installed applications includes at least a portion of the metadata for each of the installed applications, and the hypervisor modifies the metadata to include the instruction to launch the proxy application before performing the providing step.

4. The method of claim 1, wherein the metadata for each of the installed applications further comprises an identifier of the installed application that is passed by the proxy application to the hypervisor in order to identify the installed application within the guest environment to the hypervisor-aware service for launching.

5. The method of claim 1, wherein the application icon for each of the installed applications in the guest OS is displayed on the UI of the mobile device by the host OS with an additional UI element to distinguish the installed application from applications installed in the host environment.

6. The method of claim 1, further comprising the step of requiring the user to submit a password related to the guest environment prior to enabling the host OS to display the list of applications installed in the guest OS on the UI of the mobile device.

7. The method of claim 1, further comprising the steps of:
    upon receiving a request by the user to view a task manager that displays active applications running on the mobile device, requesting, by the host OS, the hypervisor to communicate with the hypervisor-aware service running in the guest environment in order to obtain a list of active applications running in the guest OS;
    receiving the list of active applications running m the guest OS from the hypervisor via the hypervisor-aware service running in the guest environment; and
    displaying on the UI of the mobile device the list of active applications running in the guest OS and a list of active applications running in the host OS.

8. A non-transitory computer-readable storage medium including instructions that, when executed on a processor in a mobile device, causes the processor to display application icons of a guest environment in a host environment of the mobile device, wherein the guest environment is running in a virtual machine supported by a hypervisor running within the host environment of the mobile device, by performing the steps of:
    forwarding, by a hypervisor-aware service running in the virtual machine to the hypervisor, a list of applications installed in a guest operating system (OS) of the virtual machine;
    for each of the installed applications, providing, by the hypervisor, metadata to a host OS running in the host environment, wherein the metadata comprises an application icon for the installed application and an instruction to launch a proxy application installed in the host environment upon a selection by a user of the application icon and wherein the host OS displays the application icon on a user interface (UI) of the mobile device upon receipt of the metadata;
    upon a launch of the proxy application by the host OS when a user selects the application icon on the UI of the mobile device, requesting, by the proxy application, the hypervisor to communicate with the hypervisor-aware service running in the virtual machine to launch the installed application in the guest environment;
    requesting, by the hypervisor-aware service, a list of information providers from the hypervisor, the information providers originating from the host OS; and
    generating registration information for the list of information providers, wherein the hypervisor-aware service makes at least one of the information providers available for access, based on the registration information, by the applications installed on the guest OS.

9. The computer-readable storage medium of claim 8, wherein the instructions further comprise the steps of:

registering, by the hypervisor-aware service, with the guest OS to receive notifications of installations of new applications in the guest environment;

receiving, by the hypervisor-aware service, a notification from the guest OS of an installation of a new application; and forwarding metadata relating to the new application to the hypervisor to enable the host OS to display a corresponding icon for the new application on the UI of the mobile device.

10. The computer-readable storage medium of claim 8, wherein the hypervisor-aware service obtains the list of installed applications from a package manager component of the guest OS, the list of installed applications includes at least a portion of the metadata for each of the installed applications, and the hypervisor modifies the metadata to include the instruction to launch the proxy application before performing the providing step.

11. The computer-readable storage medium of claim 8, wherein the metadata for each of the installed applications further comprises an identifier of the installed application that is passed by the proxy application to the hypervisor in order to identify the installed application within the guest environment to the hypervisor-aware service for launching.

12. The computer-readable storage medium of claim 8, wherein the application icon for each of the installed applications in the guest OS is displayed on the UI of the mobile device by the host OS with an additional UI element to distinguish the installed application from applications installed in the host environment.

13. The computer-readable storage medium of claim 8, wherein the instructions further comprise the step of requiring the user to submit a password related to the guest environment prior to enabling the host OS to display the list of applications installed in the guest OS on the UI of the mobile device.

14. The computer-readable storage medium of claim 8, wherein the instructions further comprise the steps of:

upon receiving a request by the user to view a task manager that displays active applications running on the mobile device, requesting, by the host OS, the hypervisor to communicate with the hypervisor-aware service running in the guest environment in order to obtain a list of active applications running in the guest OS;

receiving the list of active applications running the guest OS from the hypervisor via the hypervisor-aware service running in the guest environment; and displaying on the UI of the mobile device the list of active applications running in the guest OS and a list of active applications running in the host OS.

15. A mobile device comprising a processor configured to display application icons of a guest environment in a host environment of the mobile device, wherein the guest environment is running in a virtual machine supported by a hypervisor running within the host environment of the mobile device, by performing the steps of:

forwarding, by a hypervisor-aware service running in the virtual machine to the hypervisor, a list of applications installed in a guest operating system (OS) of the virtual machine;

for each of the installed applications, providing, by the hypervisor, metadata to a host OS running in the host environment, wherein the metadata comprises an application icon for the installed application and an instruction to launch a proxy application installed in the host environment upon a selection by a user of the application icon and wherein the host OS displays the application icon on a user interface (UI) of the mobile device upon receipt of the metadata;

upon a launch of the proxy application by the host OS when a user selects the application icon on the UI of the mobile device, requesting, by the proxy application, the hypervisor to communicate with the hypervisor-aware service running in the virtual machine to launch the installed application in the guest environment;

requesting, by the hypervisor-aware service, a list of information providers from the hypervisor, the information providers originating from the host OS; and generating registration information for the list of information providers, wherein the hypervisor-aware service makes at least one of the information providers available for access, based on the registration information, by the applications installed on the guest OS.

16. The mobile device of claim 15, wherein the processor is further configured to perform the steps of:

registering, by the hypervisor-aware service, with the guest OS to receive notifications of installations of new applications in the guest environment;

receiving, by the hypervisor-aware service, a notification from the guest OS of an installation of a new application; and forwarding metadata relating to the new application to the hypervisor to enable the host OS to display a corresponding icon for the new application on the UI of the mobile device.

17. The mobile device of claim 15, wherein the hypervisor-aware service obtains the list of installed applications from a package manager component of the guest OS, the list of installed applications includes at least a portion of the metadata for each of the installed applications, and the hypervisor modifies the metadata to include the instruction to launch the proxy application before performing the providing step.

18. The mobile device of claim 15, wherein the metadata for each of the installed applications further comprises an identifier of the installed application that is passed by the proxy application to the hypervisor in order to identify the installed application within the guest environment to the hypervisor-aware service for launching.

19. The mobile device of claim 15, wherein the application icon for each of the installed applications in the guest OS is displayed on the UI of the mobile device by the host OS with an additional UI element to distinguish the installed application from applications installed in the host environment.

20. The mobile device of claim 15, wherein the processor is further configured to perform the step of requiring the user to submit a password related to the guest environment prior to enabling the host OS to display the list of applications installed in the guest OS on the UI of the mobile device.

* * * * *